(12) United States Patent
Yuan et al.

(10) Patent No.: US 12,354,403 B2
(45) Date of Patent: Jul. 8, 2025

(54) DATA OBTAINING METHOD AND APPARATUS

(71) Applicant: Honor Device Co., Ltd., Guangdong (CN)

(72) Inventors: Jiangfeng Yuan, Shenzhen (CN); Chuan Liao, Shenzhen (CN); Junwei Zhou, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 399 days.

(21) Appl. No.: 17/966,142

(22) Filed: Oct. 14, 2022

(65) Prior Publication Data

US 2023/0052356 A1 Feb. 16, 2023

Related U.S. Application Data

(63) Continuation of application No. PCT/CN2022/092485, filed on May 12, 2022.

(30) Foreign Application Priority Data

Aug. 12, 2021 (CN) .......................... 202110925831.X

(51) Int. Cl.
*G06V 40/16* (2022.01)
*G06T 7/00* (2017.01)
(Continued)

(52) U.S. Cl.
CPC .......... *G06V 40/172* (2022.01); *G06T 7/0002* (2013.01); *G06V 10/141* (2022.01);
(Continued)

(58) Field of Classification Search
CPC .. G06V 40/172; G06V 10/141; G06V 10/761; G06V 40/40; G06T 7/0002;
(Continued)

(56) References Cited

U.S. PATENT DOCUMENTS

| 2018/0149748 | A1* | 5/2018 | Yang | G06V 40/166 |
| 2018/0211398 | A1* | 7/2018 | Schmidt | G01S 17/87 |

(Continued)

FOREIGN PATENT DOCUMENTS

| CN | 107808127 A | 3/2018 | |
| CN | 108965721 A * | 12/2018 | ........... H04B 10/503 |

(Continued)

OTHER PUBLICATIONS

Andrew Dean Payne, "Development of a Full-Field Time-of-Flight Range Imaging System," The University of Waikato, XP055486879, URL: https://researchconunons.waikato.ac.nz/bitstream/handle/10289/3521/thesis.pdf?sequence=1&isAllowed=y (2008).

*Primary Examiner* — Stephen R Koziol
*Assistant Examiner* — Michael Kim Maiden
(74) *Attorney, Agent, or Firm* — Leydig, Voit & Mayer, Ltd.

(57) ABSTRACT

A first frame of time of flight (TOF) data including projection off data and infrared data is obtained, and after determining that a data block satisfying that a number of data points with values greater than a first threshold is greater than a second threshold is present in the infrared data, TOF data for generating a first frame of a TOF image is obtained based on a difference between the infrared data and the projection off data. Because the data block satisfying the number of data points with values greater than the first threshold is greater than the second threshold is an overexposed data block, and the projection off data is TOF data acquired by a TOF camera with a TOF light source being off, the difference between the infrared data and the projection off data can correct the overexposure, improving quality of the first frame of the TOF image.

19 Claims, 15 Drawing Sheets

(51) Int. Cl.
*G06V 10/141* (2022.01)
*G06V 10/74* (2022.01)

(52) U.S. Cl.
CPC .. *G06V 10/761* (2022.01); *G06T 2207/10028* (2013.01); *G06T 2207/10048* (2013.01); *G06T 2207/10144* (2013.01); *G06T 2207/30201* (2013.01)

(58) Field of Classification Search
CPC . G06T 2207/10028; G06T 2207/10048; G06T 2207/10144; G06T 2207/30201; G06T 1/0007; H04N 5/33; H04N 17/002; H04N 23/20; H04N 25/705; H04N 23/73
See application file for complete search history.

(56) References Cited

U.S. PATENT DOCUMENTS

| | | | |
|---|---|---|---|
| 2019/0108409 A1 | 4/2019 | Zhou et al. | |
| 2020/0125832 A1 | 4/2020 | Zhang et al. | |
| 2021/0248719 A1* | 8/2021 | Park | G06T 5/92 |
| 2021/0263136 A1 | 8/2021 | Joo et al. | |
| 2021/0352198 A1 | 11/2021 | Tang et al. | |
| 2022/0358785 A1* | 11/2022 | Bechadergue | G06V 40/166 |
| 2022/0360702 A1* | 11/2022 | Baba | H04N 23/81 |

FOREIGN PATENT DOCUMENTS

| | | |
|---|---|---|
| CN | 109522722 A | 3/2019 |
| CN | 109981902 A | 7/2019 |
| CN | 111524088 A | 8/2020 |
| CN | 112384822 A | 2/2021 |
| CN | 113126067 A | 7/2021 |
| CN | 113219476 A | 8/2021 |
| CN | 113727033 A | 11/2021 |
| CN | 113779588 A | 12/2021 |
| CN | 113780090 A | 12/2021 |
| WO | 2020045946 A1 | 3/2020 |
| WO | 2020134879 A1 | 7/2020 |
| WO | 2021059735 A1 | 4/2021 |

* cited by examiner

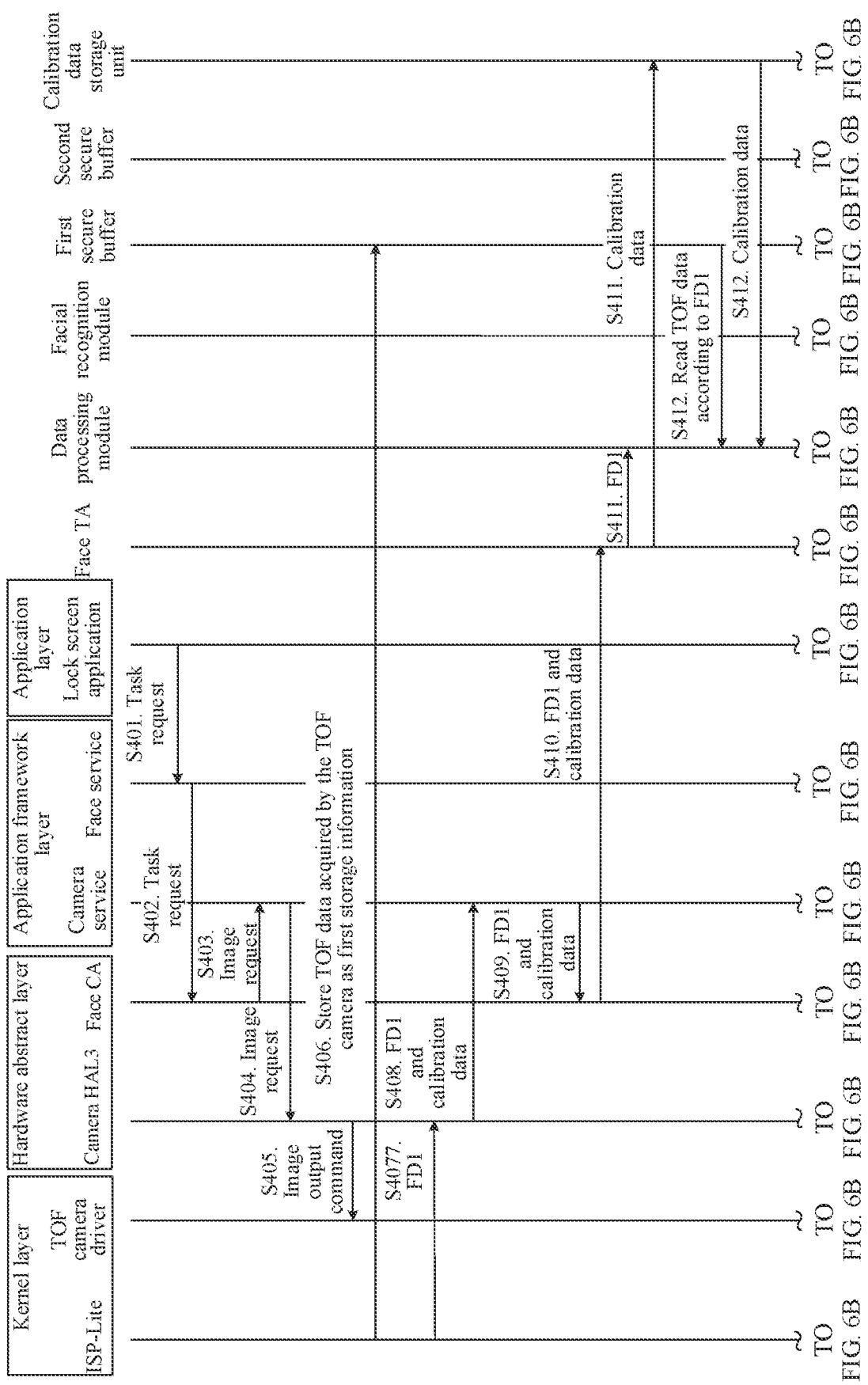

DATA OBTAINING METHOD AND APPARATUS

CROSS-REFERENCE TO RELATED APPLICATIONS

This application is a continuation of International Application No. PCT/CN2022/092485, filed on May 12, 2022, which claims priority to Chinese Patent Application No. 202110925831.X, filed on Aug. 12, 2021. The disclosures of the aforementioned applications are hereby incorporated by reference in their entireties.

TECHNICAL FIELD

This application relates to the field of communication technologies, and in particular, to a data obtaining method and an apparatus.

BACKGROUND

Facial recognition is widely used in electronic devices for identifying authorized users. For example, for a face unlock function, whether a screen is to be unlocked is determined depending on whether facial recognition is successful.

In view of the foregoing scenario, in terms of security, malicious attacks need to be considered; in terms of accuracy, inaccurate recognition results caused by poor image quality need to be considered; and in terms of user experience, latency needs to be considered.

Obviously, how facial recognition is implemented securely, accurately and quickly is a problem to be solved.

SUMMARY

This application provides a data obtaining method and an apparatus with an objective to solve how facial recognition is implemented securely, accurately and quickly.

To achieve the foregoing objective, this application provides the following technical solutions.

A first aspect of this application provides a data obtaining method, including: obtaining the first frame of time of flight (TOF) data, where the first frame of TOF data includes projection off data and infrared data, and the projection off data is TOF data acquired by a TOF camera with a TOF light source being off; determining that a data block satisfying a preset condition is present in the infrared data, where the preset condition includes that the number of data points in the data block with values greater than a first threshold is greater than a second threshold; and obtaining, based on a difference between the infrared data and the projection off data, TOF data used for generating the first frame of TOF image. Because the data block satisfying the preset condition is an overexposed data block, and the projection off data is TOF data acquired by the TOF camera with the TOF light source being off, when the projection off data is subtracted from the infrared data, overexposure can be corrected to improve quality of the first frame of TOF data. The higher quality first frame of TOF data being used for facial recognition provides not only greater security but also higher accuracy and execution speed.

Optionally, the obtaining the first frame of TOF data includes: acquiring the projection off data after the TOF camera turns off the TOF light source; and acquiring the infrared data after the TOF camera turns on the TOF light source. The acquisition of the projection off data and the infrared data with the TOF light source of the TOF camera controlled to be off and on respectively is easy to implement.

Optionally, before the acquiring the projection off data, the method further includes: acquiring depth data used for generating a depth image, when the TOF light source of the TOF camera is on. Depth images and infrared images generated from infrared data can be used for anti-counterfeiting recognition in facial recognition, and therefore can improve security of facial recognition.

Optionally, an occasion for controlling the TOF camera to turn off the TOF light source is determined based on a first exposure time for acquiring the depth data, which can not only ensure that the depth data is acquired, but also minimize a latency of acquiring the first frame of TOF data.

Optionally, an occasion for controlling the TOF camera to turn on the TOF light source is determined based on an exposure time for acquiring the projection off data, which can not only ensure that the projection off data is acquired, but also minimize the latency of acquiring the first frame of TOF data.

Optionally, the exposure time for acquiring the projection off data is the first exposure time for acquiring the depth data or a second exposure time for acquiring the infrared data.

Optionally, the TOF camera turning off the TOF light source includes controlling the TOF light source to be turned off via a TOF sensor of the TOF camera; and the TOF camera turning on the TOF light source includes controlling the TOF light source to be turned on via the TOF sensor of the TOF camera. Using the TOF sensor to control the TOF light source to be off and on, that is, using hardware to control hardware, allows faster execution speed.

Optionally, the method further includes: determining that no such data block is present in the infrared data and processing the first frame of TOF data acquired into the first frame of TOF image. That no data block satisfying the preset condition is present in the infrared data indicates that there is no overexposed infrared data and the first frame of TOF data can be directly processed into a TOF image.

Optionally, the method further includes: generating the first frame of TOF image by using the TOF data for generating the first frame of TOF image; and performing facial recognition by using the first frame of TOF image so as to obtain a recognition result. The first frame of TOF image being used for obtaining a facial recognition result can improve the execution speed of facial recognition.

Optionally, the first frame of TOF data includes a facial recognition frame.

Optionally, before the obtaining the first frame of TOF data, the method further includes: determining, according to a safety indication frame acquired before the first frame of TOF data is acquired, that human eyes are safe when the TOF light source is on. A facial recognition frame is processed so as to obtain TOF data used for generating the first frame of TOF image, and before the processing, a safety indication frame is used to indicate that human eyes are safe. With such classification of types of TOF data, it is ensured that human eyes are safe when TOF data is used.

Optionally, the method further includes: determining, according to the safety indication frame, that human eyes are not safe when the TOF light source is on; and controlling the TOF camera to shut down, which can avoid harm to human eyes caused by infrared light of the TOF camera.

Optionally, a specific implementation of the obtaining the first frame of TOF data is: storing the first frame of TOF data acquired by the TOF camera into a trusted execution environment TEE via a kernel layer. A specific implementation of the determining that a data block satisfying a preset condition is present in the infrared data and obtaining, based on a difference between the infrared data and the projection off data, TOF data used for generating the first frame of TOF image is: in the TEE, determining that a data block satisfying the preset condition is present in the infrared data and obtaining, based on the difference between the infrared data and the projection off data, the TOF data used for generating the first frame of TOF image. Through the foregoing specific implementations, TOF data is processed in a TEE so as to improve security of the TOF data.

A second aspect of this application provides a data obtaining method, including: acquiring TOF data at a first moment by using an exposure parameter; and acquiring the first frame of TOF data at a second moment by using the exposure parameter, where an interval between the second moment and the first moment is within a preset range and the first moment is earlier than the second moment. As the interval between the first moment and the second moment is within the preset range, the preset range may be so set as to make the interval between the second moment and the first moment not very long, so that an external environment where the first frame of TOF data is acquired is similar to an external environment where the TOF data is acquired at the first moment. Therefore, the first frame of TOF data is acquired at the second moment by using the exposure parameter for the first moment, so as to improve the probability of fit between the exposure parameter and the environment, thereby obtaining a higher quality first frame of TOF data. This helps improve the accuracy and speed of facial recognition when TOF data is used for facial recognition for greater security.

Optionally, before the acquiring second TOF data by using the exposure parameter, the method further includes: obtaining the moment when TOF data is acquired for the last time before the second moment as the first moment; and determining that the interval between the second moment and the first moment is within the preset range. Taking the moment when acquisition is performed for the last time before the second moment as the first moment can ensure a minimum computation cost, which helps save computation resources.

Optionally, the exposure parameter is an exposure parameter adjusted based on an automatic exposure AE result. The exposure parameter adjusted based on an AE result is more adapted to ambient light, which helps obtain TOF data of higher quality.

A third aspect of this application provides a data obtaining method, including: obtaining light intensity of an environment in which the electronic device is located; and acquiring the first frame of TOF data by using an exposure time corresponding to the light intensity. The exposure time for acquiring the first frame of TOF data being obtained based on the light intensity of the environment in which the electronic device is located helps acquire TOF data whose brightness meets a requirement of facial recognition in the first frame, thereby helping improve the accuracy and speed of facial recognition.

Optionally, a process of obtaining the exposure time corresponding to the light intensity includes: confirming a target range from preset light intensity ranges, where the target range is a range to which the light intensity of the environment in which the electronic equipment is located belongs; and obtaining an exposure time corresponding to the target range.

Optionally, the light intensity ranges include an indoor light intensity range and an outdoor light intensity range. The classification into indoor light intensity range and outdoor light intensity range lays a foundation for fine granularity of distinction.

Optionally, a larger value in the light intensity ranges corresponds to a shorter exposure time so as to follow the principle that a longer exposure time leads to higher brightness of an image, ensuring reasonability of controlling image quality through exposure time.

A fourth aspect of this application provides an electronic device, including a TOF camera, a memory, and a processor. The TOF camera is configured to acquire the first frame of TOF data, where the first frame of TOF data includes projection off data and infrared data, and the projection off data is TOF data acquired by the TOF camera with a TOF light source being off. The memory is configured to store program code. The processor is configured to run the program code to implement the data obtaining method provided in the first aspect, the second aspect, or the third aspect.

A fifth aspect of this application provides a system on chip, including: at least one processor and an interface, where the interface is configured to receive code instructions and transmit the code instructions to the at least one processor; and the at least one processor runs the code instructions to implement the data obtaining method provided in the first aspect, the second aspect, or the third aspect.

A sixth aspect of this application provides a readable storage medium, where the readable storage medium stores a program; and when the program is read and run by a computing device, the data obtaining method provided in the first aspect, the second aspect, or the third aspect is implemented.

BRIEF DESCRIPTION OF DRAWINGS

FIG. 6A and FIG. 6B are a flowchart of still another facial recognition method disclosed in still another embodiment of this application;

DESCRIPTION OF EMBODIMENTS

Figure 1A:
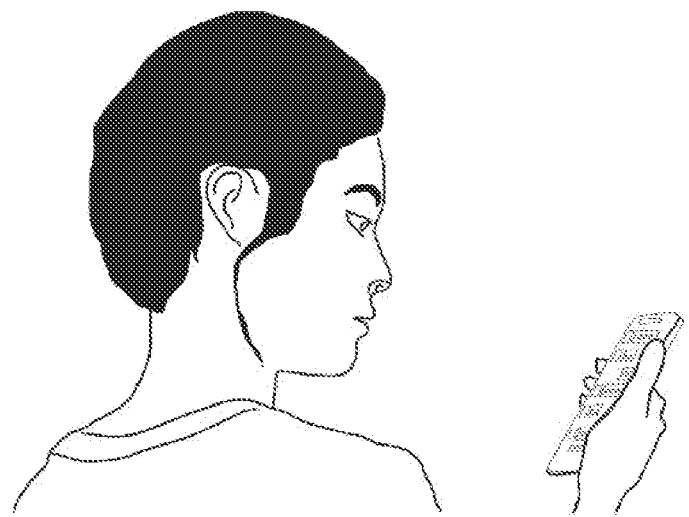
FIG. 1A shows an example of a scenario in which an electronic device is used for facial recognition.

FIG. 1A shows a scenario in which facial recognition is applied to an electronic device. When using an electronic device such as a mobile phone to implement a function that requires user authorization, a user points a camera of the electronic device at his/her face spontaneously or according to prompt information from the electronic device. Currently, the electronic device is typically equipped with an RGB (Red Green Blue) camera. After acquiring an image by using the RGB camera, the electronic device compares the image with a stored facial template and performs anti-counterfeiting recognition to obtain a recognition result, and then performs a task according to the recognition result.

For example, when expecting to unlock a screen with the face, the user points the screen of the mobile phone toward the face to allow a front camera of the mobile phone to acquire a facial image. After acquiring such image, the mobile phone performs facial recognition on this image. If the recognition is successful, the screen is unlocked; or if the recognition is unsuccessful, the screen remains locked.

The inventor has found in research that security needs to be improved when the electronic device uses the recognition result to identify an authorized user. Malicious attacks on human faces are currently divided into plane attack (for example, using a picture to fake a human face), head model mask attack (for example, using a 3D model to fake a human face), and counterfeiting with a similar face.

The inventor has also found in research that time of flight (TOF) data being used for facial recognition has the following characteristics: 1. TOF data can be used for generating depth images and infrared images, so that better anti-counterfeiting performance (that is, preventing plane attacks and head model mask attacks) can be ensured. 2. TOF data is less affected by light, so quality of the TOF data is higher. Therefore, a higher threshold value can be used for face comparison to reduce a possibility of counterfeiting with a similar face. It can be seen that TOF data being used for facial recognition can improve security.

However, at present, mainstream hardware platforms only support processing of RGB data, but do not support processing of TOF data. For example, an image signal processor (ISP) in current mainstream processors only supports processing RGB camera raw data acquired by an RGB camera into RGB raw data, but cannot process TOF data (such as camera raw data) acquired by a TOF camera. Redesigning a hardware platform for processing of the TOF data acquired by the TOF camera is too costly. Therefore, a software framework is needed for processing of the TOF data acquired by the TOF camera, but software is more vulnerable to attacks than hardware. In this case, even if TOF data is used for facial recognition, there are still security vulnerabilities.

The following embodiments of this application provide a facial recognition method applied to an electronic device to improve security of facial recognition.

Figure 2:
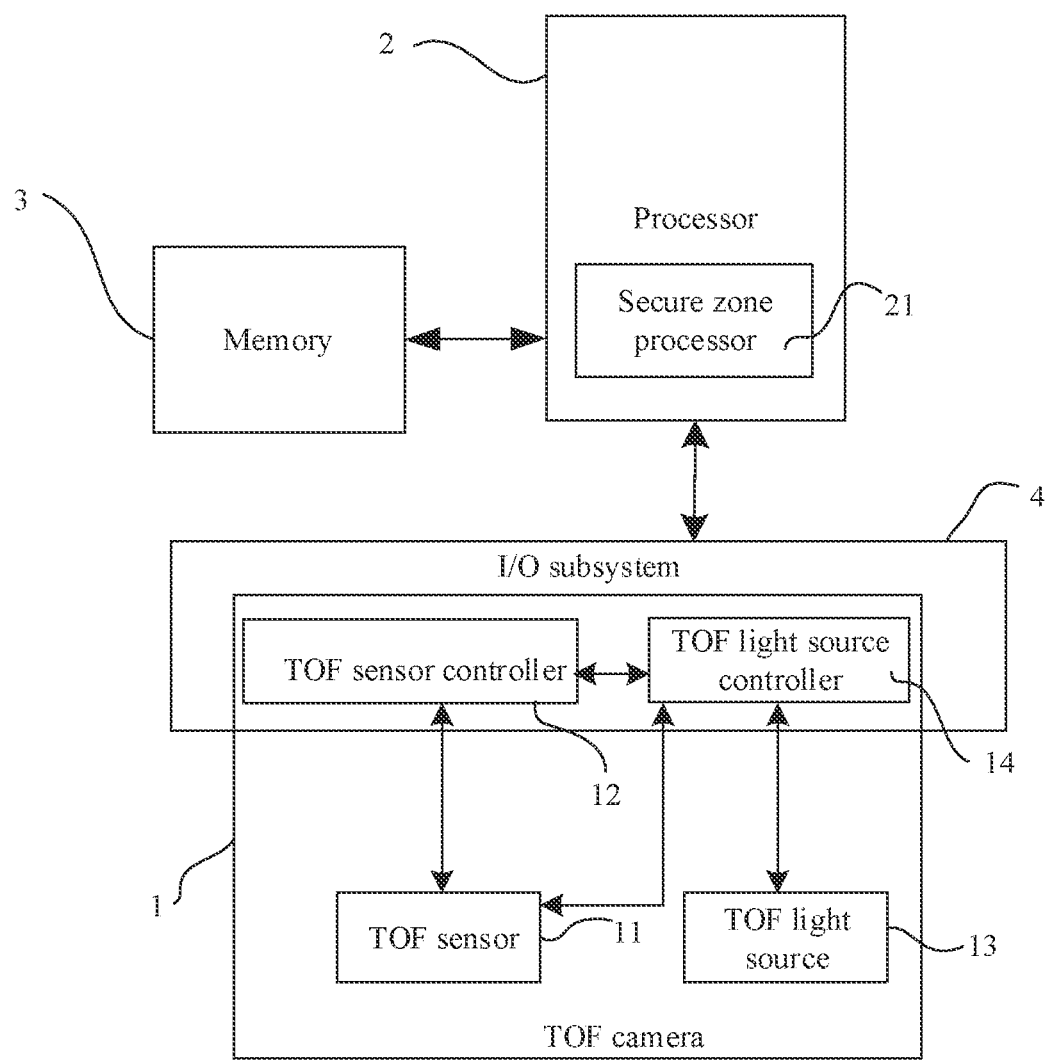
FIG. 2 is a schematic structural diagram of an electronic device disclosed in an embodiment of this application.

FIG. 2 shows an example of the electronic device, including a TOF camera 1, a processor 2, a memory 3, and an I/O subsystem 4.

The TOF camera 1 is configured to acquire TOF data. In some implementations, the TOF camera 1 is set as a front camera of the electronic device and is configured to acquire TOF data that is in front of a display (not shown in FIG. 2) of the electronic device, for example, acquiring TOF data of a human face that is in front of the display of the electronic device.

The TOF camera 1 includes a TOF sensor 11, a TOF sensor controller 12, a TOF light source 13, and a TOF light source controller 14.

In some implementations, the TOF light source controller 14 is controlled by the TOF sensor controller 12 to implement controlling of the TOF light source 13. The TOF light source 13 emits infrared (IR) light under the control of the TOF light source controller 14. The TOF sensor 11 is configured to sense infrared (IR) light reflected from an object such as a human face to acquire TOF data.

The TOF sensor controller 12 and the TOF light source controller 14 are disposed in the I/O subsystem 4 and communicate with the processor 2 via the I/O subsystem 4.

The memory 3 may be configured to store computer executable program code. Specifically, the memory 3 may include a program storage area and a data storage area. The program storage area may store program code and the like needed for implementing an operating system, a software system, and at least one function. The data storage area may store data and the like obtained, generated and used during use of the electronic device.

In some implementations, all or part of the memory 3 may be integrated into the processor 2 to serve as an internal memory of the processor 2. In some implementations, the memory 3 is an external memory relative to the processor 2 and communicates with the processor 2 via an external memory interface of the processor 2.

In some implementations, the memory 3 may include a high-speed random access memory and may further include a nonvolatile memory, for example, at least one magnetic disk storage device, a flash memory device, or a universal flash storage (UFS).

The processor 2 may include one or more processing units. For example, the processor 2 may include an application processor (AP), a graphics processing unit (GPU), and an image signal processor (ISP).

In some implementations, the processor 2 may include a secure zone processor 21. Data involved in facial recognition can be stored in the secure zone processor 21, and processing of such data is executed by the secure zone processor 21 by invoking program code in the memory 3, so as to improve security of facial recognition.

In some implementations, the secure zone processor 21 is configured to store the TOF data acquired by the TOF camera 1, generate a TOF image by using the TOF data, and perform facial recognition by using the TOF image so as to obtain a recognition result. The processor 2 may perform tasks such as face unlock or face payment by using the recognition result.

Optionally, the electronic device may further include an ambient light sensor (not shown in FIG. 2) configured to sense light intensity of an environment in which the electronic device is located. It can be understood that the ambient light sensor communicates with the processor 2 via an ambient light sensor controller (not shown in FIG. 2) disposed in the I/O subsystem 4.

It can be understood that the structure illustrated in this embodiment does not constitute any specific limitation on the electronic device. In some other embodiments, the electronic device may include more or fewer components than shown in the figure, or combine some components, or split some components, or have different component arrangements. The components shown in the figure may be implemented by using hardware, software, or a combination of software and hardware.

It can be understood that an operating system implemented by the processor 2 by running code stored in the memory 3 may be an iOS operating system, an Android open source operating system, a Windows operating system, a Harmony operating system, or the like. In the following embodiment, an Android open source operating system is used as an example for description.

Figure 3:
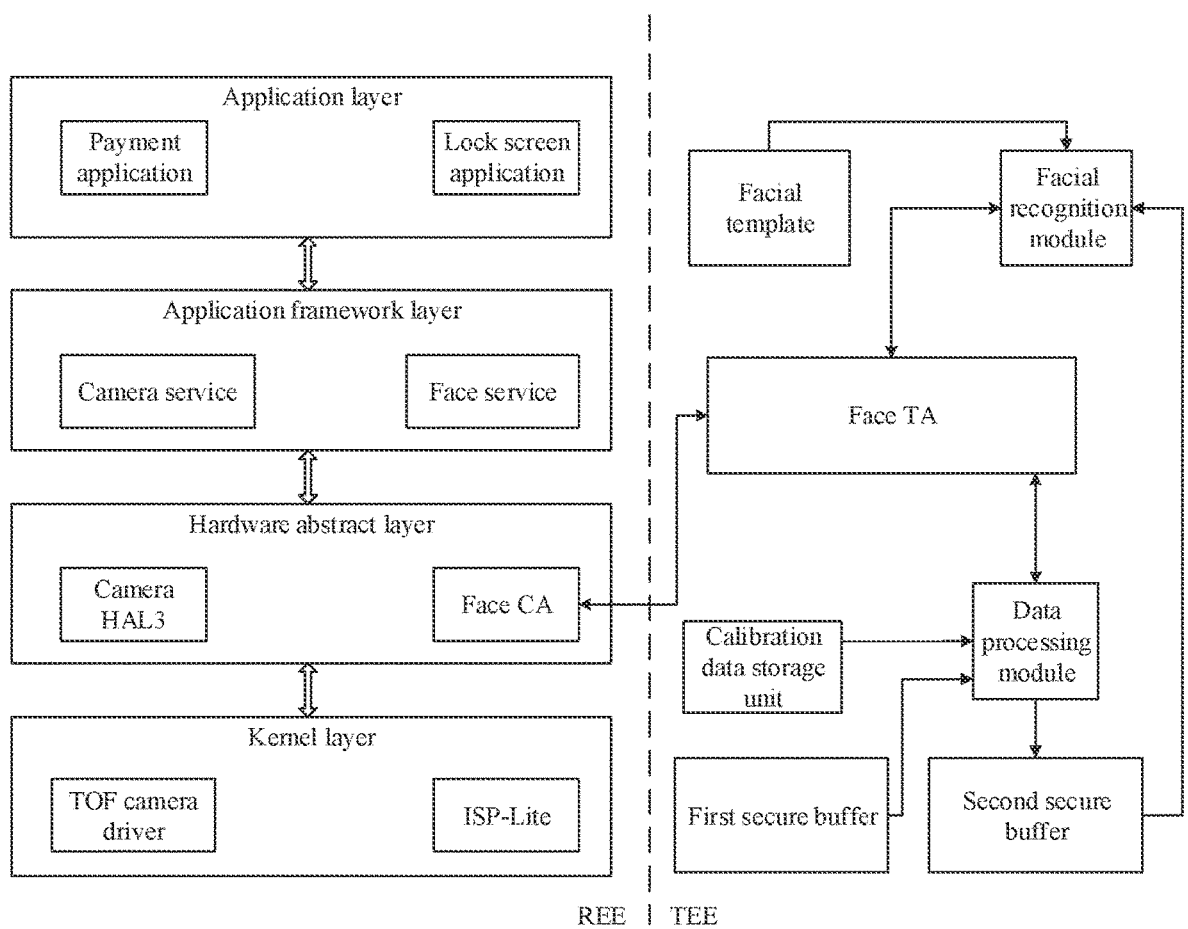
FIG. 3 is a schematic diagram of a software framework for implementing facial recognition by an electronic device disclosed in an embodiment of this application.

The processor 2 of the electronic device runs program code stored in the memory 3, so that a software framework shown in FIG. 3 that is based on the Android open source operating system can be implemented.

The software framework includes a trusted execution environment (TEE) and a rich execution environment (REE) for executing rich commands. The TEE may be implemented by the secure zone processor 21 of the processor 2 by running program code.

The REE includes layers of the Android open source operating system, including but not limited to: an application layer, an application framework layer, a hardware abstract layer, and a kernel layer.

The application layer may include a series of application program packages. As shown in FIG. 3, the application program packages may include a payment application and a lock screen application. The applications can initiate task requests in different scenarios to trigger facial recognition.

The application framework layer provides an application programming interface (API) and a programming framework for application programs at the application layer. The application framework layer includes some predefined functions. As shown in FIG. 3, the application framework layer may include a camera service and a face service. The camera service is used to implement a camera function. The face service is used to implement a facial recognition function.

The hardware abstract layer is configured to abstract hardware. It hides details of platform-specific hardware interfaces and provides a virtual hardware platform for an operating system, making it independent of hardware and portable on a variety of platforms. A camera hardware abstract layer (Camera HAL3) at the hardware abstract layer is configured to control the camera in response to a command of the camera service. A face client application (Face CA) accesses a trusted application in the TEE by invoking an application programming interface (API) of a TEE client located in the REE, so as to use a security function provided by the TEE and the trusted application.

The kernel layer is a layer between hardware and software. Driver software of hardware is typically set up at the kernel layer. In FIG. 3, one of the functions of ISP-Lite at the kernel layer is to drive ISP-Lite (part of ISP) in the processor to convert TOF data acquired by the TOF sensor (such as TOF camera raw data) into a data format commonly used in image processing, such as TOF raw data. In the following embodiments, data obtained after processing by the ISP-Lite and TOF data acquired by the TOF camera are collectively referred to as TOF data. A TOF camera driver at the kernel layer is configured to drive the TOF camera. Applications, modules, and units used for facial recognition based on TOF data are included in the TEE. A face trusted application (Face TA) functions to schedule the modules and units in the TEE and communicate with the REE. A data processing module is configured to process data such as raw data. A facial recognition module is configured to implement functions such as facial recognition using a facial template and facial template management.

Based on the framework shown in FIG. 3, the electronic device can process TOF data into a TOF image in the TEE and perform facial recognition in the TEE by using the TOF image to obtain a recognition result. This means that, on a basis that TOF data is used for facial recognition to improve security, data processing and recognition are both implemented in the TEE to further improve security.

The following describes the facial recognition method disclosed in the embodiments of this application with reference to FIG. 3. As shown in FIG. 4, a facial recognition method performed by an electronic device disclosed in an embodiment of this application includes the following steps.

S401. An application at the application layer transmits a task request to the face service at the application framework layer.

It can be understood that the application may initiate a task in response to at least one command, at least one operation of a user, at least one sensor signal, or the like and send a task request to the face service. A lock screen application is used as an example. A user presses a power button to trigger an unlock task, and the lock screen application sends an unlock request to the face service.

S402. The face service transmits the task request to the face client application (Face CA) at the hardware abstract layer.

S403. In response to the task request, the Face CA transmit an image request to the camera service at the application framework layer.

S404. The camera service transmits the image request to the camera hardware abstract layer (Camera HAL3) at the hardware abstract layer.

S405. In response to the image request, the Camera HAL3 transmits an image output command to the TOF camera driver at the kernel layer to drive the TOF camera to acquire TOF data.

S406. The ISP-Lite at the kernel layer stores the received and processed TOF data as first storage information into a first secure buffer in the TEE. The first storage information indicates a storage address.

That the ISP-Lite stores the received and processed TOF data into the TEE is equivalent to that the TOF data is stored directly into a secure zone from hardware (the ISP of the processor), so that a possibility of being attacked is reduced.

S407. The ISP-Lite at the kernel layer transmits the first storage information to the Camera HAL3 at the hardware abstract layer.

As the first storage information is transmitted in the REE, to guarantee security of the first storage information, optionally, the first storage information may be encrypted information, that is, ciphertext. In this step, an example of the encrypted information is file descriptor (FD), used to describe a storage location and a read manner.

For ease of description, ciphertext of the first storage information is referred to as FD1 for short.

S408. The Camera HAL3 transmits FD1 and calibration data to the camera service at the application framework layer.

As calibration data is required for subsequent generation of TOF image, the Camera HAL3 obtains calibration data pre-configured in the REE and transmits it along with FD1 to the TEE.

Optionally, the Camera HAL3 may obtain one part of calibration data from a storage unit in the REE and obtain the other part of calibration data from the TOF camera.

S409. The camera service transmits FD1 and the calibration data to the Face CA at the hardware abstract layer.

S410. The Face CA transmits FD1 and the calibration data to the face trusted application (Face TA) in the TEE.

It can be understood that information exchange between the modules at the layers in the REE may all comply with the communication protocols between the layers.

That storage information of TOF data is transmitted to the TEE based on the existing framework of operating system lays a foundation for processing of TOF data in the TEE. In addition, that the ISP-Lite stores the received and processed TOF data into the TEE guarantees security of the TOF data.

S411. The Face TA in the TEE transmits FD1 to the data processing module in the TEE and stores the calibration data into a calibration data storage unit into the TEE.

S412. The data processing module reads the TOF data from the first secure buffer according to FD1 and reads the calibration data from the calibration data storage unit.

S413. The data processing module generates a depth image and an infrared image by using the TOF data and the calibration data of the TOF camera.

S414. The data processing module stores a TOF image as second storage information into a second secure buffer in the TEE.

Because this is all implemented in the TEE, the second storage information can be unencrypted.

S415. The data processing module transmits the second storage information to the Face TA.

S416. The Face TA transmits the second storage information to the facial recognition module.

S417. The facial recognition module reads the TOF image from the second secure buffer according to the second storage information.

S418. The facial recognition module performs facial recognition on the TOF image read to obtain a recognition result.

Specifically, the facial recognition module performs facial comparison on the TOF image by invoking a pre-configured facial template so as to obtain a comparison result, and performs anti-counterfeiting recognition by using the TOF image so as to obtain an anti-counterfeiting result. The recognition result can be determined based on the comparison result and the anti-counterfeiting result. For example, if the comparison result is that the comparison is successful, and the anti-counterfeiting result is that the anti-counterfeiting recognition is successful, then the recognition result is a pass.

As mentioned above, as the TOF image includes a depth image and an infrared image, a higher comparison threshold value may be used when the infrared image is compared with the face template, which ensures higher accuracy, thereby reducing a possibility of counterfeiting with a similar face. Besides, the depth image and infrared image can both be used for anti-counterfeiting recognition, thereby ensuring higher anti-counterfeiting performance (that is, higher performance against plane attacks and head model mask attacks).

S419. The facial recognition module transmits the recognition result to the Face TA.

S420. The Face TA in the TEE transmits the recognition result to the Face CA in the REE.

S421. The Face CA transmits the recognition result to the face service at the application framework layer.

S422. The face service transmits the recognition result to the application that has initiated the task request at the application layer.

A lock screen application at the application layer is used as an example. After initiating an unlock request, the lock screen application receives a recognition result, and performs the unlock task if the recognition result indicates successful recognition; or performs a task of keeping a screen-locked state if the recognition result indicates unsuccessful recognition.

It can be understood that other applications at the application layer initiate a task request and obtain a facial recognition result in similar processes, which are not further described herein.

The facial recognition method described in this embodiment uses TOF data for facial recognition, which ensures higher security. Further, facial recognition based on TOF data is implemented in the TEE, which can guarantee security of the TOF data, data processing, and recognition process, so as to further improve security of facial recognition.

In addition, transmission of the data storage information, recognition result, and calibration data between the REE and the TEE are implemented based on the layers of the Android operating system, which features good compatibility.

It can be understood that, as the calibration data is camera domain data rather than face domain data, in some implementations, the calibration data may alternatively be transferred from the camera service to the Face CA via the face service.

It can be understood that, after the calibration data is stored in the calibration data storage unit in the TEE, as long as the processor is on without power outage, the calibration data in the calibration data storage unit in the TEE will not be lost, and therefore there is no need to reload the calibration data. Certainly, the calibration data can be reloaded, which is not limited herein. The calibration data and FD1 being transmitted together is only one implementation, and they may alternatively be transmitted separately along the transmission path described above.

It can be understood that the TOF camera acquires a set of TOF data for one exposure, and after acquiring multiple sets of TOF data for continual exposures, stops for a first duration, followed by continual exposures again, and then stops for the first duration again, and goes so on. The multiple sets of TOF data acquired continually are referred to as one frame of TOF data, and another multiple sets of TOF data acquired after an interval of the first duration is another frame of TOF data. Without considering processing latency and transmission latency of other modules, the ISP-Lite stores frames of TOF data in turn to the first secure buffer also at intervals of the first duration and transmits storage information of the frames of TOF data in turn to the Face CA also at intervals of the first duration. The Face CA transmits the storage information of the frames of TOF data in turn to the Face TA also at intervals of the first duration. Therefore, the Face TA receives the frames of TOF data in turn also at intervals of the first duration. In FIG. 4, S406 may be storing any frame of TOF data; S407 to S411 may be transmitting FD of any frame of TOF data; S413 to S419 is a process of processing in relation to this frame of TOF data; and S420 to S422 may be a process of processing in relation to a recognition result of this frame of TOF data or a process of processing in relation to recognition results of multiple frames of TOF data.

Because the TOF camera acquires TOF data by projecting infrared light, it is necessary to pay attention to safety of human eyes during the acquisition process. Also, because quality of a TOF image influences accuracy of a recognition result, and the exposure parameter of the TOF camera has immediate effects on the quality of TOF images, it is necessary to adjust and optimize the exposure parameter of the TOF camera.

Figure 4A:
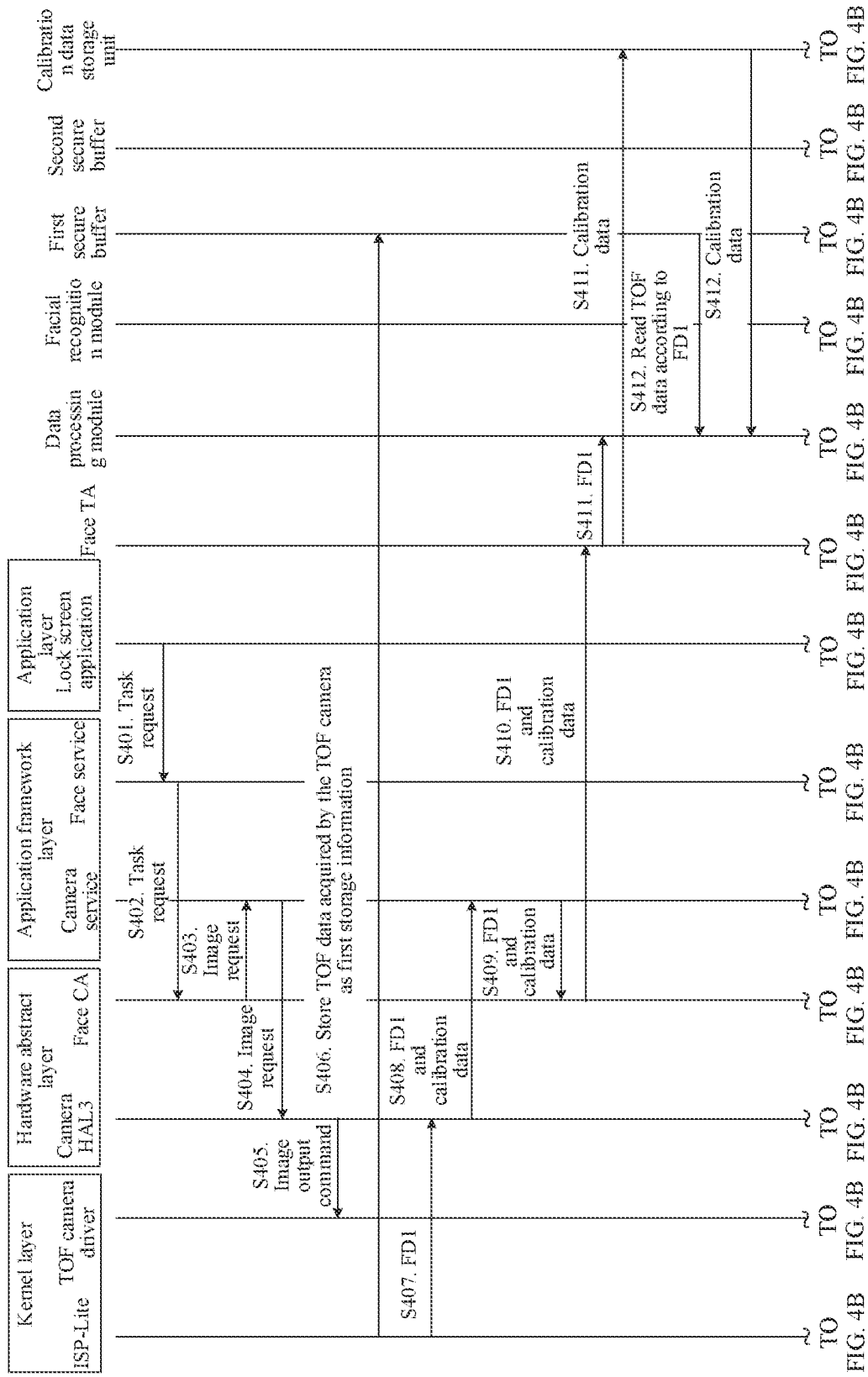
FIG. 4A and FIG. 4B are a flowchart of a facial recognition method disclosed in an embodiment of this application.
Figure 4B:
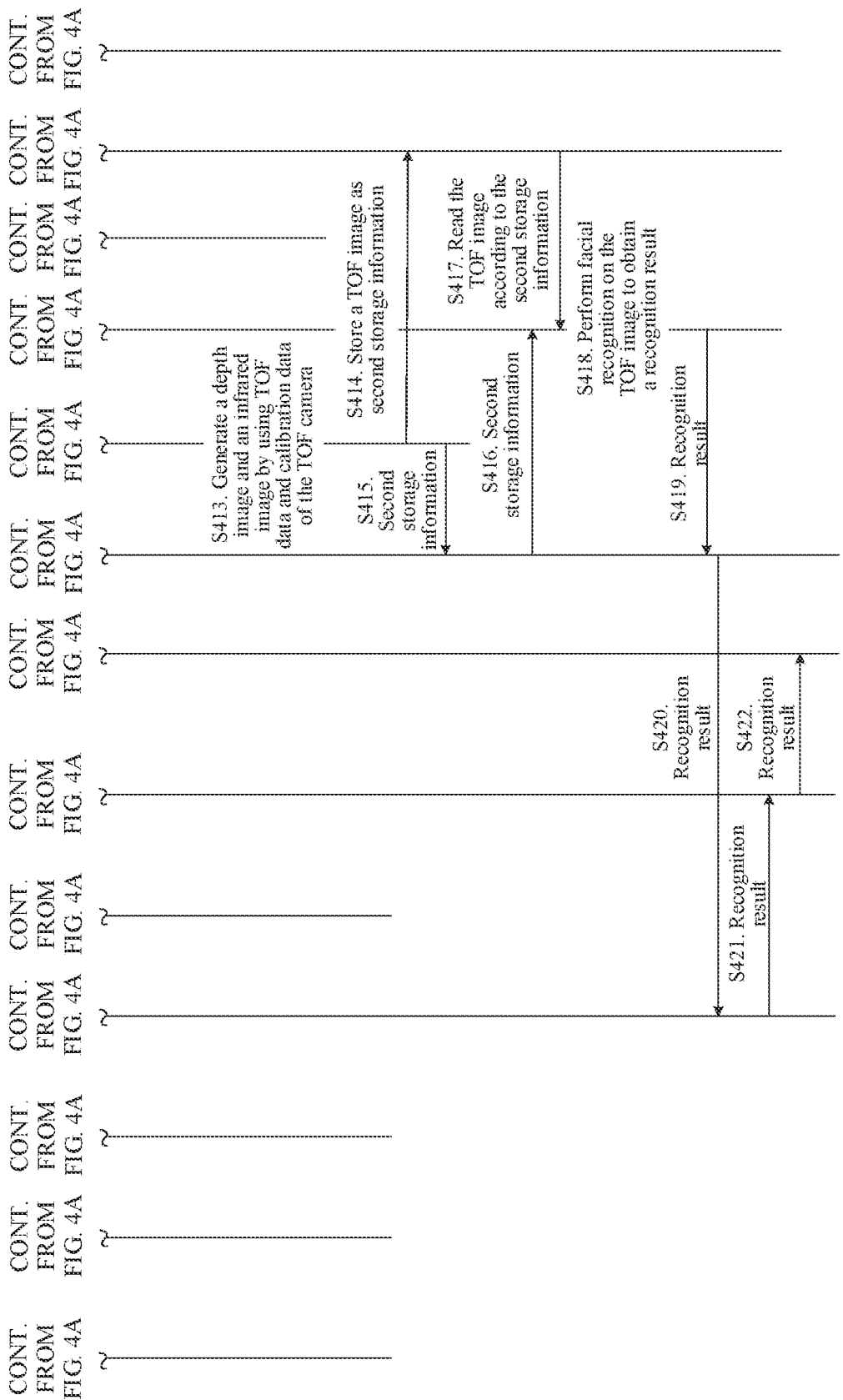

In an embodiment of this application, the process shown in FIG. 4A and FIG. 4B is further improved so that the data processing module can generate different parameters for adjusting the TOF camera based on type of the TOF data received.

Figure 5A:
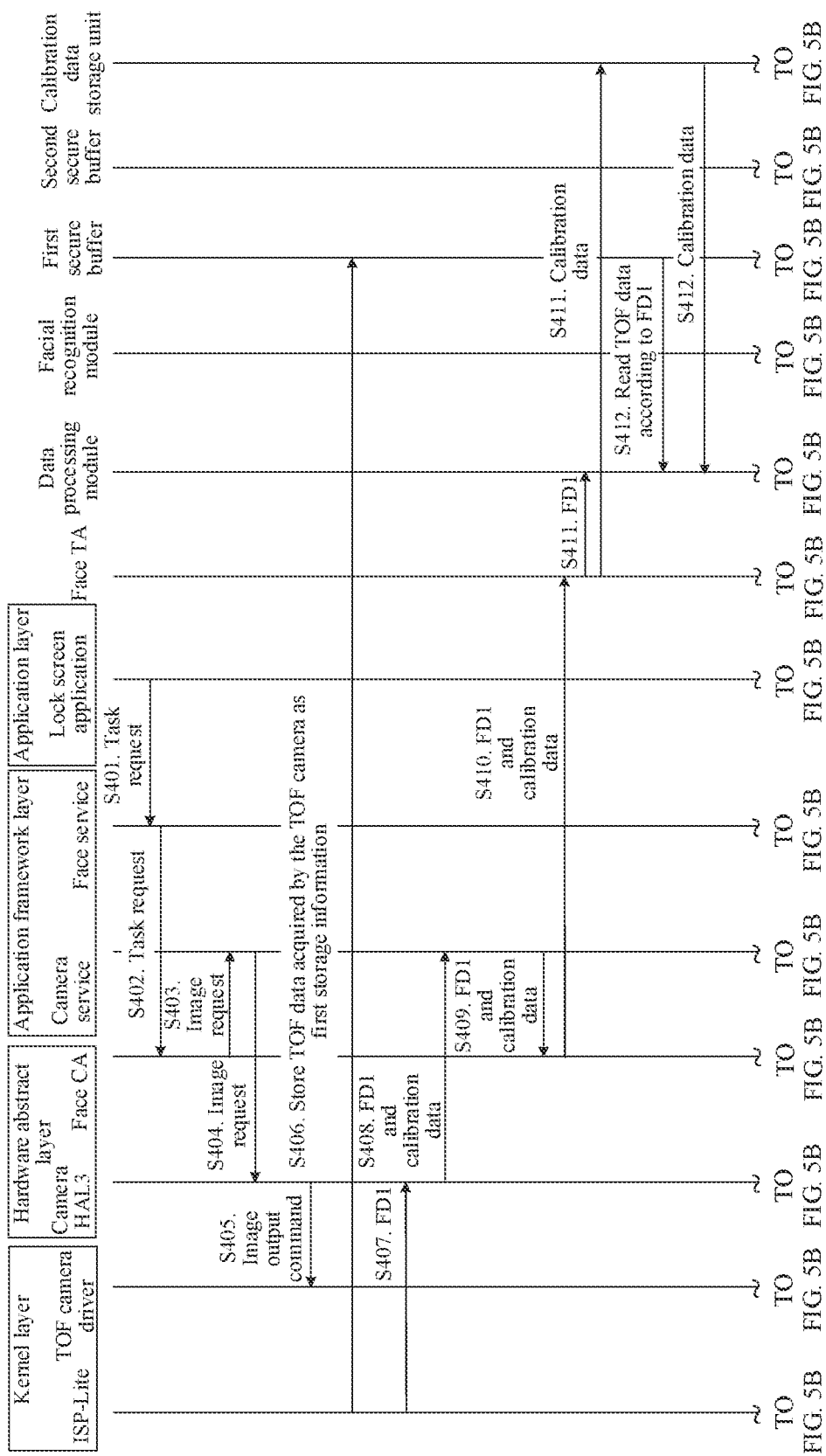
FIG. 5A and FIG. 5B are a flowchart of another facial recognition method disclosed in another embodiment of this application.
Figure 5B:
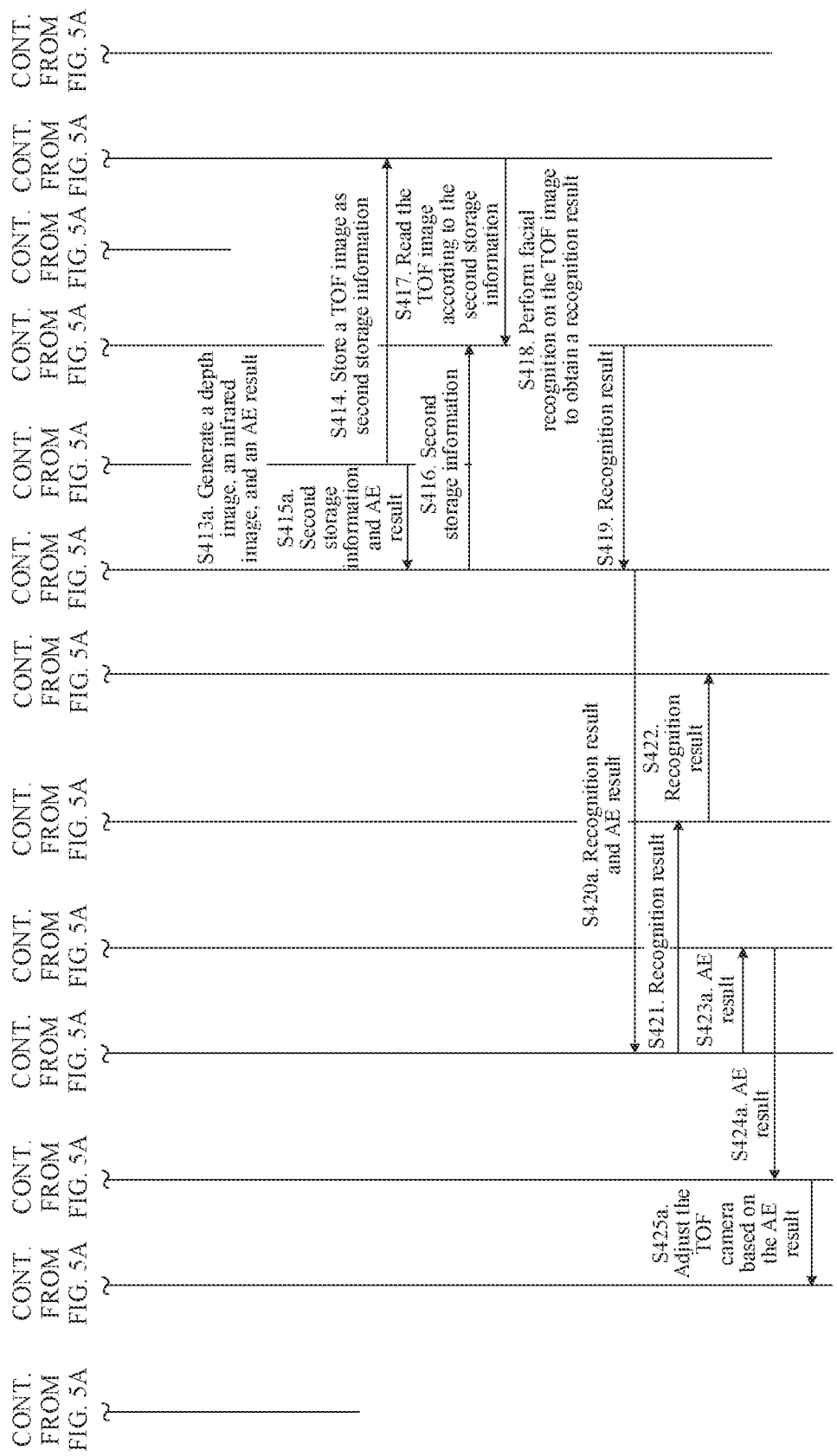

FIG. 5A and FIG. 5B show a process of an automatic exposure (AE) result being generated and fed back and a camera being controlled based on the AE result, for which only differences of FIG. 5A and FIG. 5B from FIG. 4A and FIG. 4B are described.

S413a. In response to the TOF data being a facial recognition frame, the data processing module in the TEE generates a depth image, an infrared image, and an AE result.

In this embodiment of this application, the TOF camera divides TOF data acquired into safety indication frames and facial recognition frames. The safety indication frame carries a human eyes safety flag bit, which is used to indicate whether infrared light emitted by the TOF camera is safe for human eyes. The facial recognition frame is a TOF data frame used for facial recognition. In some implementations, type of a TOF data frame is indicated by at least one of a value, a character, or a character string in that TOF data frame.

In some implementations, in the TOF data in TOF data acquisition, the first to the fourth frame of TOF data are safety indication frames, and the subsequent frames of TOF data are facial recognition frames. The safety indication frame includes a human eyes safety flag bit.

The AE result is used for adjusting an exposure parameter of the TOF camera. Optionally, the AE result includes but is not limited to an exposure time and a physical gain of the TOF sensor. One generation method of the AE result is: extracting a face region from TOF raw data which is a raw image, calculating a brightness value of the face region, and comparing the brightness value with a pre-configured target brightness value, to obtain the exposure time and the physical gain of the TOF sensor. One AE result may be generated for each frame of TOF data, or one AE result may be generated for multiple frames of TOF data.

S415a. The data processing module in the TEE transmits the second storage information and the AE result to the Face TA in the TEE.

It can be understood that, when an AE result of a previous frame of TOF data is the same as a latest AE result, the latest AE result may not be transmitted so as to save resources in the TEE.

S420a. The Face TA in the TEE transmits the recognition result and the AE result to the Face CA at the hardware abstract layer in the REE.

S423a. The Face CA transmits the AE result to the camera service at the application framework layer in the REE.

S424a. The camera service transmits the AE result to the Camera HAL3 at the hardware abstract layer.

S425a. The Camera HAL3 adjusts the TOF camera based on the AE result via the TOF camera driver.

The Camera HAL3 may transmit the AE result to the TOF sensor controller via the TOF camera driver, and the TOF sensor controller controls the TOF sensor to acquire TOF data according to the AE result.

Figure 6B:
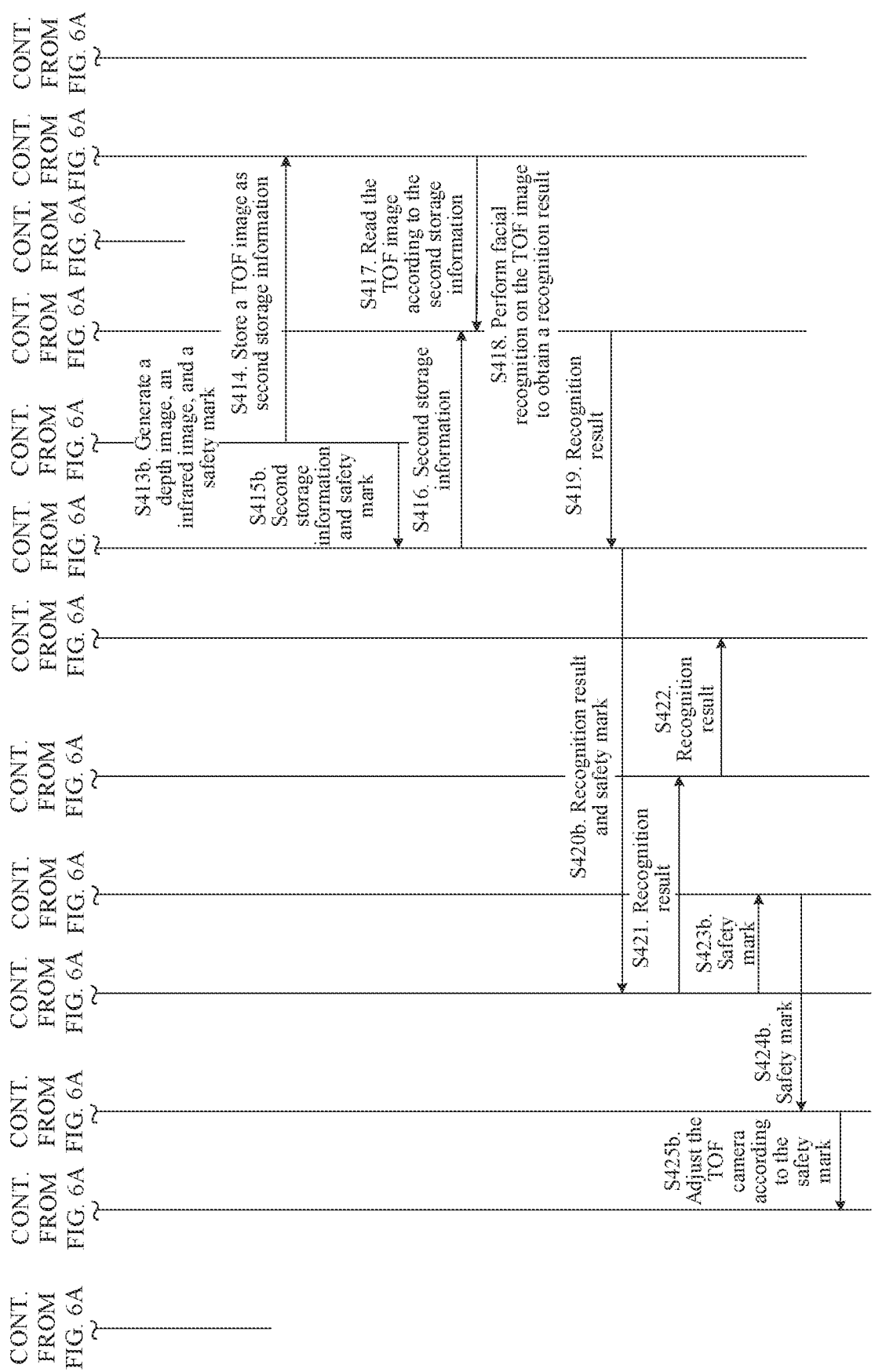

FIG. 6A and FIG. 6B show a process of a safety mark being generated and fed back and a camera being controlled according to the safety mark, for which only differences of FIG. 6A and FIG. 6B from FIG. 4A and FIG. 4B are described.

S413b. In response to the TOF data being a safety indication frame, the data processing module in the TEE generates a safety mark.

The safety mark is used to indicate whether the TOF light source is safe for human eyes.

Optionally, a generation method of the safety mark is: after a TOF data frame carrying a human eyes safety flag bit (that is, a safety indication frame) is received, extracting the human eyes safety flag bit, and according to the human eyes safety flag bit, determining whether human eyes are safe, so as to generate the safety mark. If the human eyes safety flag bit indicates safety, a safety mark indicating safety is obtained. If the human eyes safety flag bit indicates non-safety, a safety mark indicating non-safety is obtained.

S415b. The data processing module in the TEE transmits the second storage information and the safety mark to the Face TA in the TEE.

Generally, in a process from start of acquisition to end of acquisition of the TOF camera, the safety indication frames all carry the same human eyes safety flag bits. For example, from the first safety indication frame to the fourth safety indicator frame, the human eyes safety flag bits all indicate that human eyes are safe or all indicate that human eyes are unsafe. In this case, the multiple safety marks obtained are the same, and therefore only one safety mark may be transmitted so as to save resources in the TEE.

However, it is not excluded that in some cases, the human eyes flag bit is not the same in multiple security indication frames. Therefore, it is possible to transmit only the last safety mark, which means that the safety mark is determined according to only the last safety indication frame received, so as to save resources in the TEE.

S420b. The Face TA in the TEE transmits the recognition result and the safety mark to the Face CA at the hardware abstract layer in the REE.

S423b. The Face CA transmits the safety mark to the camera service at the application framework layer in the REE.

S424b. The camera service transmits the safety mark to the Camera HAL3 at the hardware abstract layer.

S425b. The Camera HAL3 adjusts the TOF camera according to the safety mark via the TOF camera driver.

Adjustment of the TOF camera includes but is not limited to that: if the safety mark indicates that human eyes are unsafe, the TOF camera is turned off, or emission intensity of the TOF light source is reduced; or if the safety mark indicates that human eyes are safe, TOF data is acquired and identified as a TOF data frame for facial recognition (that is, a facial recognition frame).

Based on FIG.2, optionally, the Camera HAL3 may send an off command to the TOF sensor controller via the TOF camera driver so as to turn off the TOF camera.

In summary, after obtaining TOF raw data using the processor, the electronic device processes the TOF raw data into a TOF image in the TEE and uses the TOF image for facial recognition, so as to improve security of facial recognition.

In addition, transmission of the data storage information of the TOF data to the TEE is implemented under cooperation between the layers of the Android operating system. This not only lays a foundation for processing in the TEE but also implements compatibility with the Android operating system.

It can be seen that, even if the processor of the electronic device does not support generation of a TOF image, the foregoing framework and processes described in the embodiments can still implement facial recognition by using TOF data, thereby improving security.

Further, safety guarantee of human eyes and adjustment of the exposure parameter can also be implemented, allowing the electronic device to have better performance on the basis of improved security of facial recognition.

It can be understood that, although the foregoing FIG. 4A and FIG. 4B to FIG. 6A and FIG. 6B use an Android operating system as an example, the facial recognition method described in the embodiments of this application is not limited to the Android operating system. For example, operations of the TEE are not limited to the Android operating system, and therefore functions of the applications, modules, and units in the TEE can also be implemented on other operating systems. Operations of the REE are not limited to the Android operating system either, and therefore transmission paths of TOF data and calibration data to the TEE, transmission paths of task requests, feedback paths of recognition results, and the like can all be adapted to different operating systems, provided that TOF data and calibration data can be transmitted from the REE to the TEE, that a task request triggers acquisition of TOF data, and that a recognition result is used for task execution.

The inventor has found that, in addition to security, accuracy and execution speed of facial recognition also have room for improvement. That is, facial recognition still has the following problems.

Inaccurate recognition result caused by poor image quality: Due to influence of ambient light, data acquired by a camera may have quality defects such as overexposure, blur, and insufficient brightness, whereas facial recognition is based on the data acquired by the camera. Therefore, it is possible that a comparison result is incorrect. For example, facial recognition fails even in the case of one same person.

Poor user experience caused by excessive latency: With reference to the scenario shown in FIG. 1A, if facial recognition is so slow that a user needs to wait for long, comfort of use for the user is reduced. Poor image quality is usually the cause of excessive latency.

Improvement of image quality and increase of execution speed are contradictory: To improve image quality, processing such as iteration and noise reduction need to be performed on an image to make the image converge, and more processing leads to slower processing speed.

The inventor has also found in research that TOF imaging has the following characteristics.

(1) TOF data acquired by a TOF camera is less affected by ambient light, and therefore in most scenarios, quality of the first frame of TOF data (such as the first facial recognition frame) acquired by the TOF camera can meet a required recognition accuracy. As such, in most scenarios, the first frame of TOF data can be used for obtaining a facial recognition result with higher accuracy.

Face unlock service is still used as an example. It is assumed that a face attempting to unlock is a face that is already recorded in the electronic device, that is, the face attempting to unlock can unlock the screen. In this case, unlocking can be achieved using the first frame of TOF data.

(2) When a feedback adjustment mechanism (the feedback adjustment mechanism means using previous acquired data and camera calibration data to adjust an exposure parameter of subsequently acquired data so as to improve image quality) is in effect, TOF data converges (converging means no more changing) quickly after about 3 to 4 frames of TOF data.

Continuing with the foregoing example, it is assumed that unlocking with the first frame of TOF data has failed. Then, with the feedback adjustment mechanism used to adjust the exposure parameter, convergence occurs at the third frame or fourth frame of TOF data acquired (that is, afterwards, the TOF data no longer changes even if the exposure parameter is adjusted again later), and therefore unlocking can be achieved by using the third frame or fourth frame of TOF data acquired.

The above characteristics of TOF imaging make it possible to achieve both desirable accuracy and desirable speed on the basis that TOP data is used for facial recognition so as to improve security.

In the following embodiments, on the basis that frames of TOF data are stored in turn into the TEE at intervals of the first duration and that the storage information of the frames of TOF data is transmitted to the TEE, the foregoing characteristics of TOF imaging are taken into account and the data processing module and the facial recognition module are scheduled by the Face TA, so as to quickly obtain an accurate recognition result.

Figure 7:
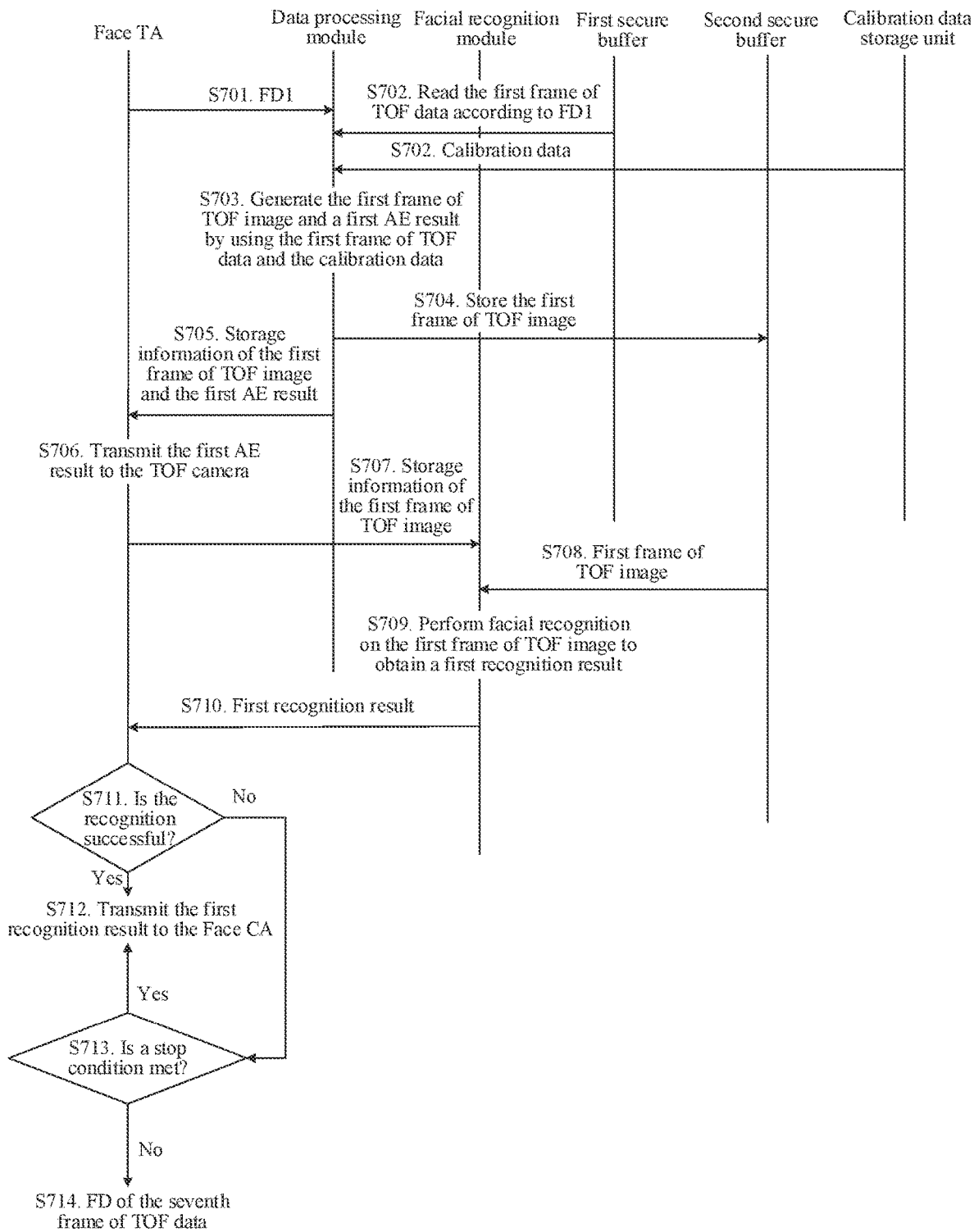
FIG. 7 is a flowchart of a data processing method disclosed in an embodiment of this application.

FIG. 7 shows a data processing method disclosed in an embodiment of this application. As compared with FIG. 4A and FIG. 4B, FIG. 5A and FIG. 5B, or FIG. 6A and FIG. 6B, improvements are made to the applications and modules in the TEE. The functions and data transmission manners of the modules in the REE are all the same as those in FIG. 4A and FIG. 4B, FIG. 5A and FIG. 5B, or FIG. 6A and FIG. 6B, which are not repeated herein. The process shown in FIG. 7 includes the following steps after the Face TA receives FD1 and the calibration data.

S701. After receiving FD of the first frame of TOF data (referred to as FD1 for short), the Face TA transmits FD1 to the data processing module.

In some implementations, the first frame of TOF data is the first frame of TOF data acquired by the TOF camera under driving by the TOF camera driver as controlled by the Camera HAL3 in response to an image request.

In some other implementations, the TOF data frames acquired by the TOF camera are identified as safety indication frames and facial recognition frames. The safety indication frame carries a human eyes safety flag bit, which is used to indicate whether infrared light emitted by the TOF camera is safe for human eyes. The facial recognition frame is a TOF data frame used for facial recognition. In this case, the first frame of TOF data in this step is the first facial recognition frame.

S702. The data processing module reads the first frame of TOF data from the first secure buffer by using FD1 and reads the calibration data from the calibration data storage unit.

In this embodiment, it is assumed that the calibration data has been stored in the calibration data storage unit.

S703. The data processing module generates a TOF image and an automatic exposure (AE) result by using the first frame of TOF data and the calibration data.

As mentioned above, the TOF image includes a depth image and an infrared image.

The AE result is used for the TOF camera to adjust an exposure parameter for TOF data acquisition. The AE result includes but is not limited to an exposure time and a physical gain of the TOF sensor. One generation method of the AE result is: extracting a face region from TOF raw image, and calculating a brightness value of the face region to be compared with a pre-configured target brightness value to obtain the exposure time and the physical gain of the TOF sensor.

For ease of description, the TOF image obtained from processing of the first frame of TOF data is referred to as the first frame of TOF image; and the AE result obtained from the first frame of TOF data is referred to as a first AE result.

S704. The data processing module stores the first frame of TOF image into the second secure buffer.

S705. The data processing module transmits storage information of the first frame of TOF image and the first AE result to the Face TA.

It can be understood that, because the storage information of the first frame of TOF image is transmitted only in the TEE, it can be transmitted in a format of plaintext.

S706. The Face TA transmits the first AE result to the TOF camera.

With reference to FIG. 4A and FIG. 4B, FIG. 5A and FIG. 5B, or FIG. 6A and FIG. 6B, an example transmission path of the first AE result to the TOF camera is: the Face TA, the Face CA, the camera service, the Camera HAL3, and the TOF sensor controller of the TOF Camera. Then the TOF sensor controller uses the first AE result to adjust parameters of the TOF camera, which include but are not limited to the exposure time.

It can be understood that a TOF data frame to which the first AE result can be applied is related to a time of the processor processing the TOF data. The TOF camera having an acquisition interval of 30 ms is used as an example. It is assumed that a total time for the processor to generate the first TOF image and the first AE result is also 30 ms, and then the first AE result can be applied earliest to the third frame of TOF data acquired by the TOF camera.

Generation and transmission of the AE result are optional steps. The purpose is to improve quality of TOF data acquired subsequently, so as to obtain a TOF image of better quality and a more accurate recognition result.

The first frame of TOF data may be acquired by using a pre-configured fixed exposure parameter.

S707. The Face TA transmits the storage information of the first frame of TOF image to the facial recognition module to trigger the facial recognition module to perform facial recognition.

It can be understood that execution of S706 and S707 is not limited to any particular order.

S708. The facial recognition module reads the first frame of TOF image from the second secure buffer by using the storage information of the first frame of TOF image.

S709. The facial recognition module performs facial recognition on the first frame of TOF image to obtain a first recognition result.

With reference to FIG. 3, the facial recognition module performs facial comparison on the first frame of TOF image by invoking the facial template. In addition to facial comparison, anti-counterfeiting recognition can also be performed by using a depth image and an infrared image. Therefore, facial recognition includes facial comparison and anti-counterfeiting recognition. When both facial comparison and anti-counterfeiting recognition are successful, the recognition result of facial recognition indicates a pass.

S710. The facial recognition module transmits the first recognition result to the Face TA.

S711. The Face TA determines whether the first recognition result indicates successful recognition, and if yes, performs S712, or if no, performs S713.

S5712. The Face TA transmits the first recognition result to the Face CA.

As mentioned above, the Face CA transmits the first identification result to the initiator of the task, for example, the lock screen application.

S713. The Face TA determines whether a stop condition is met, and if yes, performs S712, or if no, performs S714.

The stop condition may be set in advance. In this step, the stop condition includes that a time of task execution has reached a second duration threshold. An example of the second duration threshold is 5 seconds. The stop condition is optional. It is also possible to perform S714 when the first identification result indicates unsuccessful recognition, without determining whether the stop condition is met.

It can be seen that a purpose of setting the stop condition is to avoid unnecessary time consumption during task execution. If facial recognition is still not successful after a given period of time, it can be basically determined that the facial recognition result is failure. For example, a face attempting to unlock is not stored in the electronic device. Therefore, there is no need to continue with the facial recognition. Instead, the facial recognition result should be fed back to the task as soon as possible to reduce a latency of task execution and ensure better user experience.

S714. The Face TA receives a new frame of TOF data from the TOF camera.

The example is still used where an acquisition interval of the TOF camera is 30 ms and a time for the processor to generate the first frame of TOF image and the first AE result is also 30 ms. In this case, the new frame of TOF data received from the TOF camera is the seventh frame of TOF data acquired by the TOF camera.

It can be understood that, because the first AE result can be applied earliest to the third frame of TOF data, the seventh frame of TOF data is a TOF data frame acquired after the exposure parameter is adjusted by using the first AE result.

For a subsequent process to be executed by the Face TA after reception of the new TOF data frame, refer to S701 to S714. To be specific, the first frame of TOF data as the object of processing in S701 to S714 is replaced with the new frame of TOF data received, for example, the seventh frame of TOF data, and the processing result of the first frame of TOF data is adaptively replaced with a processing result of the new frame of TOF data received (for example, the first frame of TOF image is replaced with the seventh frame of TOF image), without further description herein.

Compared with a prior-art facial recognition process, the process shown in FIG. 7 at least has the following difference: An image data processing process in the prior art includes a step that image data is processed iteratively to obtain convergent image data, with a purpose of obtaining an image whose quality meets a required recognition accuracy.

RGB data is used as an example. As RGB data is easily affected by ambient light, quality of the first frame of RGB data acquired generally cannot meet the required recognition accuracy. Therefore, RGB data needs to be iteratively processed to obtain convergent RGB data, and then the convergent RGB data is used for facial recognition so as to ensure accuracy of a recognition result. Generally, for different iterative algorithms, RGB data can converge in about 10 frames if faster, or 30 to 40 frames are required for convergence if slower. Therefore, a consensus of persons skilled in the art is that the first frame of RGB data is highly likely to have poor quality due to influence of ambient light, making it meaningless to be directly used for facial recognition.

In this embodiment of this application, based on the foregoing TOF imaging principle (1), in most scenarios, convergence occurs in the first frame of TOF data. It can be known that the first frame of TOF data is highly likely to lead to a more accurate recognition result. Therefore, after the electronic device acquires the first frame of TOF data, the first frame of TOF image generated from the first frame of TOF data is directly used for obtaining a facial recognition result. In this way, a smaller processing latency can be achieved while a higher accuracy of the recognition result can be ensured. In other words, based on the foregoing principle of TOF imaging, a step that image data is iterated in order to obtain convergent image data is omitted in exchange for increase of image data processing speed.

Further, the inventor has found in research that an interval for TOF data acquisition by a TOF camera and a time for TOF image generation by a processor are usually both 30 ms, and a time for facial recognition is usually 150 ms. Therefore, a time for obtaining a recognition result by using the TOF data is: 30 ms +150 ms=180 ms. With other conditions being the same, this value can mean that the method described in this embodiment can make a user clearly feel an increased speed of unlocking, thereby improving user experience.

Because the new frame of TOF data received is acquired by using the exposure parameter determined based on the first AE result, a probability of convergence is higher. Therefore, even if the first frame of TOF data fails the recognition due to a quality problem, the new frame of TOF data received can pass the recognition successfully, with a time consumed being (30 ms+150 ms)×2=360 ms, which is still advantageous over the convergence time of RGB data.

A more specific example of a scenario to which this embodiment is applied is as follows.

Limited by a hardware condition of a mobile phone, only one processor (for example, the secure zone processor 21 shown in FIG. 2) can be used for facial recognition.

It is assumed that a face attempting to unlock is a face that is already recorded in the electronic device. When a user points his/her face at a screen of the mobile phone, the TOF camera acquires TOF data and transmits the TOF data to the processor, at intervals of 30 ms. After receiving the first frame of TOF data, the processor processes the first frame of TOF data into the first frame of depth image and the first frame of infrared image according to the process described in this embodiment and obtains a first recognition result by using the first frame of depth image and the first frame of infrared image. In the process of the processor generating the first frame of TOF image and computing the recognition result, the processor is occupied, and therefore, although the TOF camera is still transmitting TOF data frames to the processor, the processor cannot receive the subsequent TOF data frames. In a word, other TOF data frames are discarded except for the first frame of TOF data received.

It can be seen that this embodiment does not take into consideration a TOF data iteration process and therefore fits right into the foregoing scenario with one processor. In other words, in the scenario where only one processor is used for TOF data processing and facial recognition, if both recognition processing and iteration of TOF data for convergence of the TOF data need to be performed, serial processing is required for the processor, leading to consumption of a long time. However, for the method described in this embodiment, because the step of iteration of TOF data is not performed, time consumption can be reduced. Besides, as TOF data converges in the first frame in most cases, a more accurate recognition result can be ensured while time consumption of facial recognition is reduced.

In summary, based on the characteristic that TOF data is highly likely to converge in the first frame, the data obtaining method described in this embodiment ensures accurate and fast facial recognition in most cases. Besides, as the security is higher when TOF data is used for facial recognition, secure, accurate and fast facial recognition can be implemented.

The inventor has further found in research that, in an outdoor scenario, because in natural light, there is light close to infrared light emitted by a TOF light source in wavelength, the first frame of TOF data acquired is likely to be overexposed. In this case, quality of the first frame of TOF data is not good enough for obtaining an accurate recognition result. As in the foregoing example, if the first frame is unable to unlock the screen, an unlock latency required is at least 360 ms, for which there is still room for further reduction.

Figure 8:
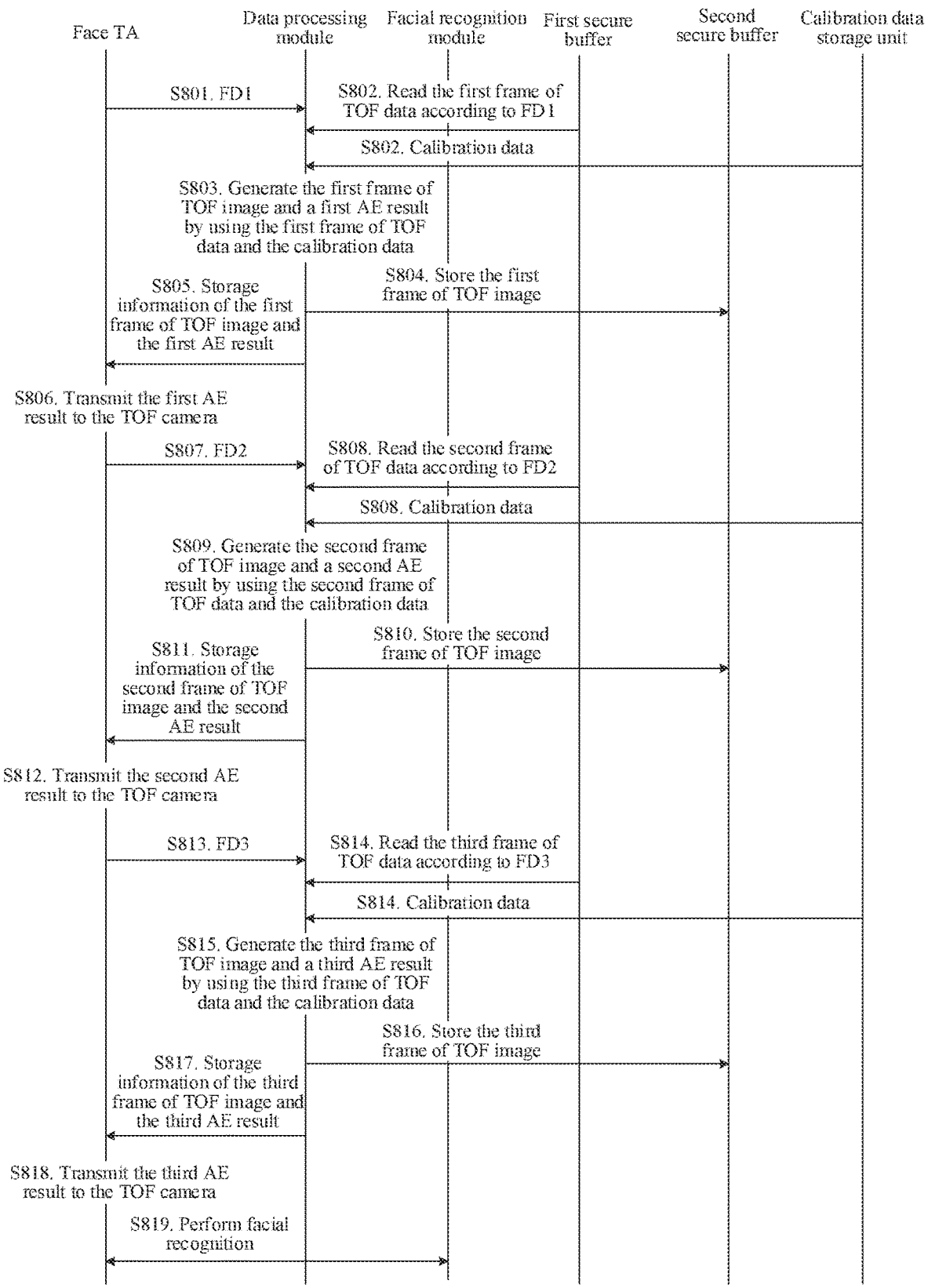
FIG. 8 is a flowchart of another data processing method disclosed in an embodiment of this application.

Another data processing method disclosed in an embodiment of this application is shown in FIGS. 8.

S801 to S806 are the same as S701 to S706. For details, refer to FIG. 8, which are not described herein.

S807 to S812 are a processing process of the second frame of TOF data after storage information of the second frame of TOF data is received, which is the same as the processing process of the first frame of TOF data. For details, refer to FIG. 8, which are not described herein.

It can be understood that the second frame of TOF data may be a TOF data frame acquired by the TOF camera by using a exposure parameter adjusted based on the first AE result, or the second frame of TOF data may have the same exposure parameter as the first frame of TOF data. Which of the foregoing cases specifically prevails depends on an interval at which the TOF camera acquires TOF data frames (for example, the foregoing interval of a first duration) and a time from reception of a TOF data frame to feedback of an AE result by the processor.

It is assumed that the TOF camera acquires and transmits data at intervals of 30 ms, and the processor processes TOF data into TOF images and obtains AE results also at intervals of 30 ms. Then the first AE result cannot be applied to acquisition of the second frame of TOF data.

S813 to S818 are a processing process of the third frame of TOF data after storage information of the third frame of TOF data is received, which is the same as the processing process of the first frame of TOF data. For details, refer to FIG. 8, which are not described herein.

It can be seen from the foregoing processes that this embodiment differs from the foregoing embodiment in that the first three frames of TOF data are received and processed.

S819. The Face TA invokes the facial recognition module to perform facial recognition.

Figure 9:
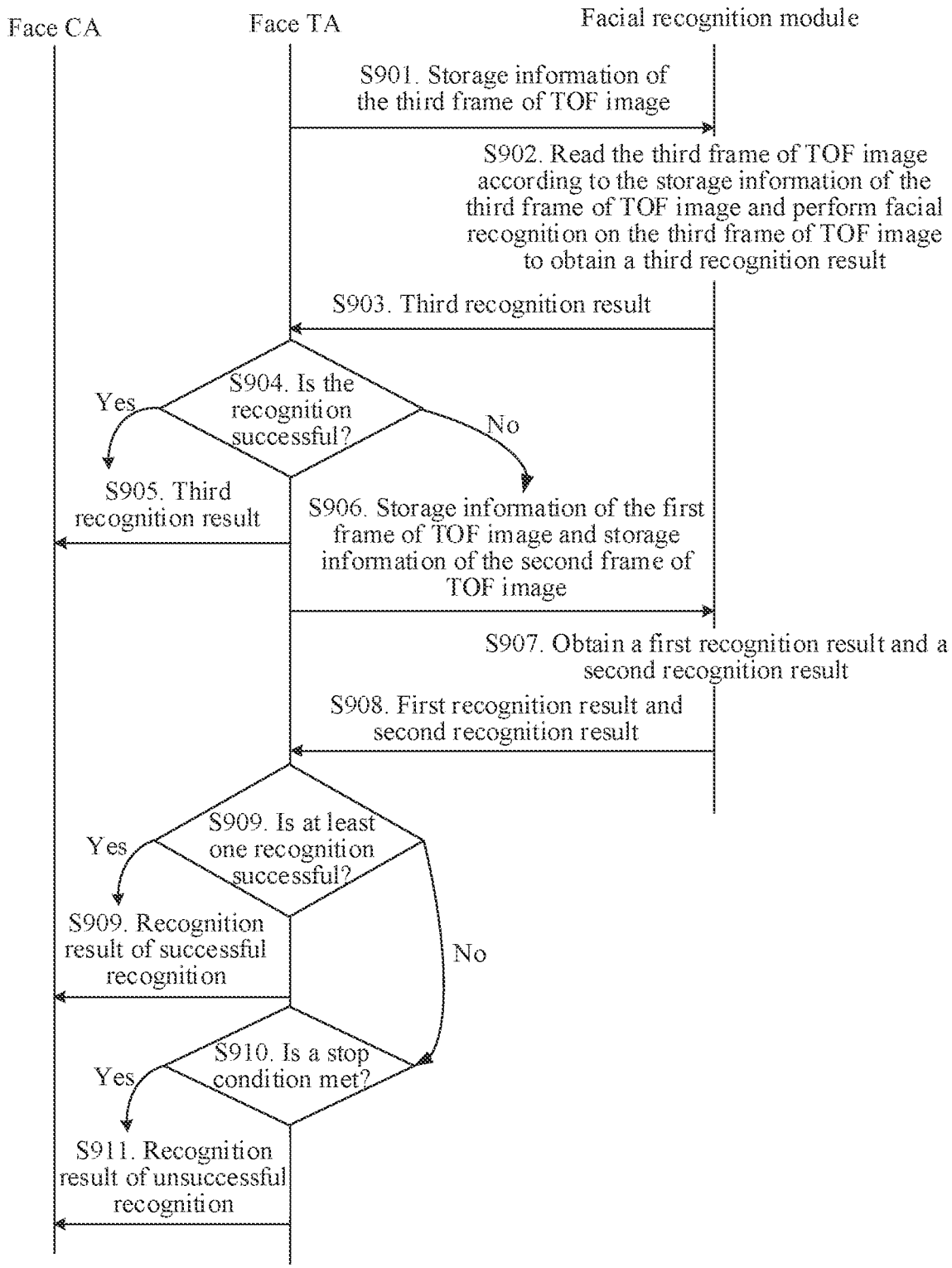
FIG. 9 is a flowchart of a specific implementation of S819 in FIG. 8.

An optional implementation of S819 is shown in FIG. 9.

S901. The Face TA transmits the storage information of the third frame of TOF image to the facial recognition module.

S902. The facial recognition module reads the third frame of TOF image by using the storage information of the third frame of TOF image, and then performs facial recognition by using the third frame of TOF image so as to obtain a recognition result.

It can be understood that the facial recognition module reads the third frame of TOF image from the second secure buffer, which is not detailed in the description of FIG. 9.

For ease of distinction, the recognition result of the third frame of image is referred to as a third recognition result.

S903. The facial recognition module transmits the third recognition result to the Face TA.

S904. The Face TA determines whether the third recognition result indicates successful recognition, and if yes, performs S905, or if no, performs S906.

S905. The Face TA transmits the third recognition result to the Face CA.

Because the third frame of TOF data is most likely to be data acquired after the exposure parameter is adjusted based on the AE result, quality of the third frame of TOF data is most likely to be optimal. Therefore, using the third frame of TOF image first for facial recognition can further reduce time consumption.

S906. The Face TA transmits the storage information of the first frame of TOF image and the storage information of the second frame of TOF image to the facial recognition module.

S907. The facial recognition module obtains the first recognition result and the second recognition result.

The first recognition result is a result of facial recognition on the first frame of TOF image. The second recognition result is a result of facial recognition on the second frame of TOF image.

It can be understood that in what order the first frame of TOF image and the second frame of TOF image are used for facial recognition is not limited.

S908. The facial recognition module transmits the first recognition result and the second recognition result to the Face TA.

S909. If at least one of the first recognition result and the second recognition result indicates a pass, the Face TA transmits a recognition result indicating successful recognition to the Face CA.

S910. If neither of the first recognition result and the second recognition result indicate successful recognition, the Face TA determines whether a stop condition is met, and if yes, performs S911, or if no, repeats the process shown in FIG. 8.

For a definition of the stop condition, refer to the preceding embodiment. In this step, a duration threshold in the stop condition may be shorter than the duration threshold in the stop condition in the preceding embodiment. This is because in this embodiment, a plurality of frames of TOF data have been acquired and processed. In this step, an example of the duration threshold is 3 seconds.

It should be noted that, when the process shown in FIG. 8 is executed again, in "the N-th frame of TOF data", N is no longer an ordinal position of a data frame as acquired by the TOF camera, but N=1, 2, 3, meaning an ordinal position of a TOF data frame as currently received by the processor when the process shown in FIG. 8 is executed. For example, when S801 is executed again, the TOF camera may have acquired the 9th frame of TOF data, but in the current execution of the process shown in FIG. 8, the processor receives the first frame of TOF data. Therefore, "the first frame of TOF data" described in S801 refers to the first frame of TOF data in the current execution of the process shown in FIG. 8 rather than the first frame of TOF data actually acquired by the TOF camera.

S911. The Face TA transmits a recognition result indicating unsuccessful recognition to the Face CA.

It can be understood that, in addition to the manner shown in FIG. 9, other alternative manners may be used to implement S819. For example, the first frame of TOF image, the second frame of TOF image, and the third frame of TOF image are used for facial recognition in turn; or only the third frame of TOF image is used for facial recognition, and if a recognition result indicates failure, the process shown in FIG. 8 is executed again, so as to save resources such as memory. Other implementations are not listed herein one by one. In the method described in this embodiment, based on the foregoing TOF imaging principle (2) where TOF data converges after 2 to 3 frames, three frames of TOF data are processed consecutively to obtain a recognition result, which helps to achieve a shorter latency in the case of an outdoor scenario than in the preceding embodiment.

An example of an application scenario of the process shown in FIG. 8 is as follows.

It is assumed that a face attempting to unlock is a face that is already recorded in the electronic device. When a user points his/her face at a screen in an outdoor environment, the TOF camera acquires TOF data at intervals of 30 ms and transmits the TOF data to the processor. After receiving the first frame of TOF data, the processor processes the TOF data received and generates the first TOF image and a first AE result.

As the electronic device is in an outdoor environment, it is highly likely that using the first frame of TOF data will not lead to a successful unlock. Therefore, after generating the first TOF image and transmitting the first AE result, the processor continues to receive and process another TOF data frame rather than performing facial recognition. Because a time for generation of a TOF image and an AE result is 30 ms, which is similar to a time of acquisition and transmission of TOF data by the TOF camera, the second frame of TOF data can continue to be received and processed after the first frame of TOF data is processed, and the third frame of TOF data can continue to be received and processed after the second frame of TOF data is processed.

Based on the foregoing time, the first AE result generated from the first frame of TOF data can be applied earliest to the third frame of TOF data. Therefore, the third frame of TOF data is highly likely to lead to a successful unlock.

The shortest time consumed for obtaining a recognition result by using the third frame of TOF data is: 30 ms×3+150 ms. As compared with the preceding embodiment, in the case of unsuccessful unlocking using the first frame of TOF data, unlocking using the seventh frame is changed to unlocking using the third frame, thereby increasing the speed and reducing the latency.

It can be seen that, if the first frame of TOF data can do the unlock, two times for processing of TOF data (generation of a TOF image and an AE result), that is 60 ms, are added as compared with the preceding embodiment. Therefore, the data processing method described in this embodiment increases the unlocking speed in an outdoor scenario with strong light by compromising the unlocking speed achieved using the first frame of TOF data.

It can be understood that, because the first AE result is applied to the third frame of TOF data, optionally, in FIG. 8, the second frame of TOF data and the AE result of the second frame of TOF data may not be processed, that is, S807 to S812 may not be performed so as to save resources. Adaptively, the recognition result is obtained without participation of the second frame of TOF image.

In summary, the second frame of TOF data may be received only without being processed. Alternatively, the second frame of TOF data may be discarded rather than received.

In this embodiment, three frames of TOF data being processed consecutively in one process is used as an example. In fact, the number of TOF data frames processed consecutively is related to a time consumed for generating and feeding back an AE result and a first duration interval at which the TOF camera acquires data frames.

Based on the scenarios to which the foregoing embodiments are applied respectively, it can be understood that the method described above in FIG. 7 or FIG. 8 can be selectively used for advantages according to a determining condition used. Based on the software framework shown in FIG. 3, another data processing method disclosed in an embodiment of this application includes the following steps.

1. The Face CA obtains an intensity of ambient light.

Based on the software framework shown in FIG. 3, after receiving a task request, the Face CA may further send a light intensity request to obtain the intensity of ambient light. It can be understood that the light intensity request may be sent to a corresponding driver at the kernel layer via the application framework layer and a corresponding module at the hardware abstract layer. The corresponding driver at the kernel layer drives a light sensor to sense the intensity of ambient light and feed it back to the Face CA.

2. The Face CA transmits the intensity of ambient light to the Face TA.

3. The Face TA determines whether the intensity of ambient light is greater than a preset first intensity threshold, and if yes, performs the data processing progress shown in FIG. 7, or if no, performs the data processing progress shown in FIG. 8.

In this embodiment, the light intensity is used for determining an environment in which an electronic device is located, and a process more appropriate to the environment is used to obtain a facial recognition result, and therefore, accuracy and speed of obtaining the facial recognition result can be improved to the greatest extent on the basis that security is improved.

The inventor has further found in research that, whether in an outdoor or indoor scenario, when ambient light is extremely strong and the sensor of the TOF camera faces a strong light source, quality of the first frame of TOF data cannot not support obtaining of an accurate facial recognition result. Therefore, TOF data needs to converge, leading to increased time for facial recognition.

Figure 1B:
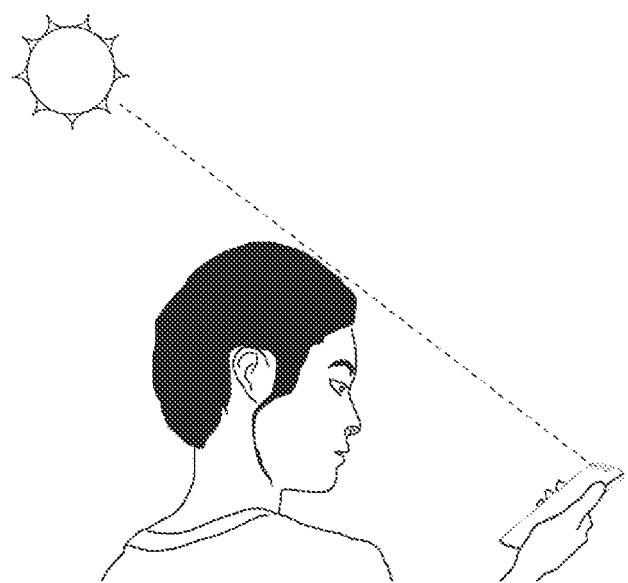
FIG. 1B shows an example of a scenario in which an electronic device is used for facial recognition in strong light.

For example, in FIG. 1B, a user is in strong sunlight outdoors with the back toward the sun. In this circumstance, the user points a front camera of a mobile phone at the face, expecting an unlock with the face (it is assumed that the user's face is already stored in the mobile phone as a face module), and it takes more time to make the unlock than in an indoor environment.

The embodiments of this application provide a data obtaining method in an attempt to address the foregoing problem, with a purpose of obtaining a higher quality first frame of TOF data, so as to improve accuracy of a recognition result obtained using the first frame of TOF data on the premise that TOF data is used for facial recognition to ensure higher security, which in turn realizes fast facial recognition.

Figure 10:
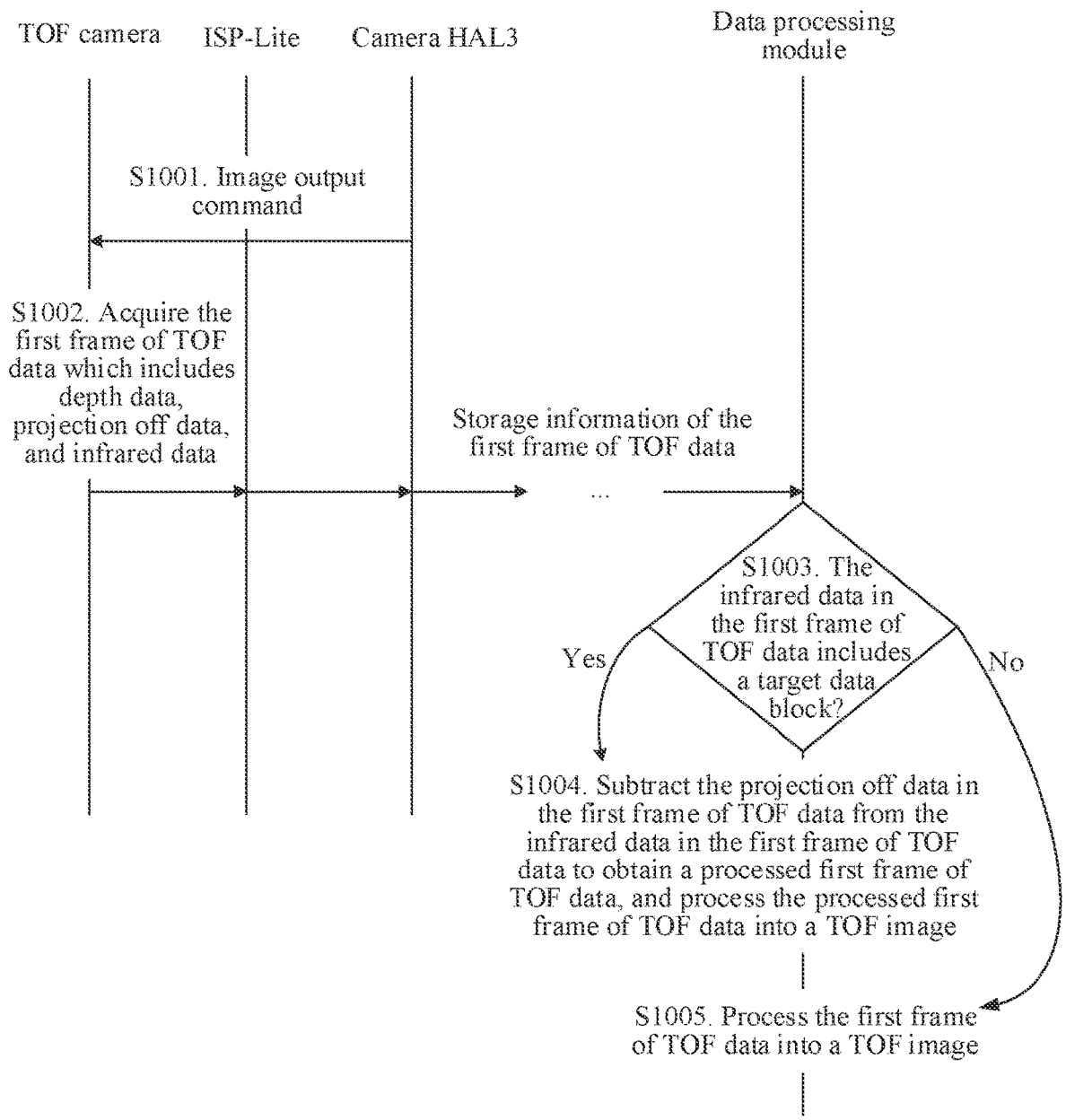
FIG. 10 is a flowchart of a data obtaining method disclosed in an embodiment of this application.

FIG. 10 shows a data obtaining method disclosed in an embodiment of this application, which is performed by the foregoing electronic device. With reference to FIG. 2 to FIG. 6A and FIG. 6B, a process shown in FIG. 10 starts from the Camera HAL3 driving the TOF camera via the TOF camera driver to acquire data and includes the following steps.

S1001. In response to an image request, the Camera HAL3 transmits an image output command to the TOF camera.

With reference to FIG. 2 and FIG. 3, it can be understood that the Camera HAL3 may transmit the image output command to the TOF camera via the TOF camera driver at the kernel layer.

S1002. In response to the image output command, the TOF camera acquires the first frame of TOF data which includes depth data, projection off data, and infrared data.

The depth data is data used for generating a depth image. The projection off data is TOF data acquired by the TOF camera with the TOF light source being off. The infrared data is data used for generating an infrared image.

The depth data and infrared data are both TOF data acquired by the TOF camera with the TOF light source being on.

When the TOF camera is (powered on) started, the TOF light source is turned on by default. In some implementations, the TOF sensor controller of the TOF camera transmits the image output command to the TOF sensor, and in response to the image output command, the TOF sensor acquires the depth data and transmits an off command to the TOF light source controller. In response to the off command, the TOF light source controller turns off the TOF light source, and the TOF sensor acquires the projection off data. The TOF sensor transmits an on command to the TOF light source controller, and in response to the on command, the TOF light source controller turns on the TOF light source and the TOF sensor acquires the infrared data.

In some implementations, an example of the first frame of TOF data is: four sets of depth data, one set of projection off data, and one set of infrared data. "One set of data" may be understood as one two-dimensional array.

The TOF sensor acquires the sets of depth data in turn each using a first exposure time, acquires the infrared data using a second exposure time, and acquires the projection off data using the first exposure time or the second exposure time. The first exposure time and the second exposure time may be carried in the image output command or separately transmitted to the TOF camera by the Camera HAL3, or may be transmitted to the TOF camera by another module, or may be acquired in advance by the TOF camera from a storage module.

It can be understood that an occasion for the TOF sensor to transmit the off command to the TOF light source controller is related to the first exposure time, and an occasion for the TOF sensor to transmit the turning on command to the TOF light source controller is related to the exposure time of the projection off data.

In some implementations, the TOF sensor can mark TOF data acquired in a first time range as projection off data. The first time range may be determined based on an interval between the time when the TOF sensor sends the off command and the time when the TOF sensor sends the on command. The TOF sensor may mark TOF data acquired before the first time range as depth data and mark TOF data acquired after the first time range as infrared data.

It can be understood that in what order the TOF camera acquires the depth data, projection off data, and infrared data is not limited. For example, the TOF camera may acquire them in the order of projection off data, infrared data, and depth data, or acquire them in the order of infrared data, depth data, and projection off data. The occasions for the TOF sensor to transmit the off command and the on command are adjusted according to this order.

In this step, the TOF sensor is used to control the TOF light source to be on or off, featuring higher execution speed.

S1003. After obtaining the first frame of TOF data, the data processing module determines whether the infrared data in the first frame of TOF data includes a target data block, and if yes, performs S1004, or if no, performs S1005.

For specifically how the data processing module obtains the first frame of TOF data, refer to FIG. 4A and FIG. 4B, FIG. 5A and FIG. 5B, or FIG. 6A and FIG. 6B, which is not repeated herein.

The infrared data is a two-dimensional array. It can be understood that the two-dimensional array includes some values arranged in rows and columns, and each value may be regarded as a data point. The target data block is a data block that meets the following preset condition: the number of data points in the data block with values greater than a first threshold is greater than a second threshold.

As mentioned above, the infrared data acquired by the TOF sensor is a two-dimensional array, which is processed by the ISP-Lite into infrared raw data, that is, an infrared raw image. Therefore, it can be understood that the target data block is a target region in the infrared raw image, and the values in the target data block are the brightness values of corresponding pixels in the target region. Therefore, for the infrared raw image, the target region is a region in which the number of pixels with brightness values greater than the first threshold is greater than the second threshold.

When ambient light is extremely strong and the TOF camera faces a strong light source, TOF data acquired by the TOF camera is usually overexposed due to strong light. Therefore, brightness of most pixel values in an overexposed region of an infrared raw image generated from the TOF data is so high as to affect recognition. The condition for the target region (data block) in this step is set based on this principle.

S1004. The projection off data in the first frame of TOF data is subtracted from the infrared data in the first frame of TOF data to obtain processed first frame of TOF data, and the processed first frame of TOF data is processed into a TOF image.

S1005. The first frame of TOF data is processed into a TOF image.

It can be understood that the first frame of TOF data being processed into a TOF image means that the depth data in the first frame of TOF data is processed into a depth image and the infrared data in the first frame of TOF data is processed into an infrared image.

In the method described in this embodiment, when infrared data in the first frame of TOF is overexposed, influence of ambient light on the infrared data is removed with projection off data being subtracted from the infrared data in the first frame of TOF data, so as to improve quality of the first frame of TOF data, thereby obtaining a TOF image of higher quality, which helps improving the accuracy and speed of facial recognition.

Figure 11:
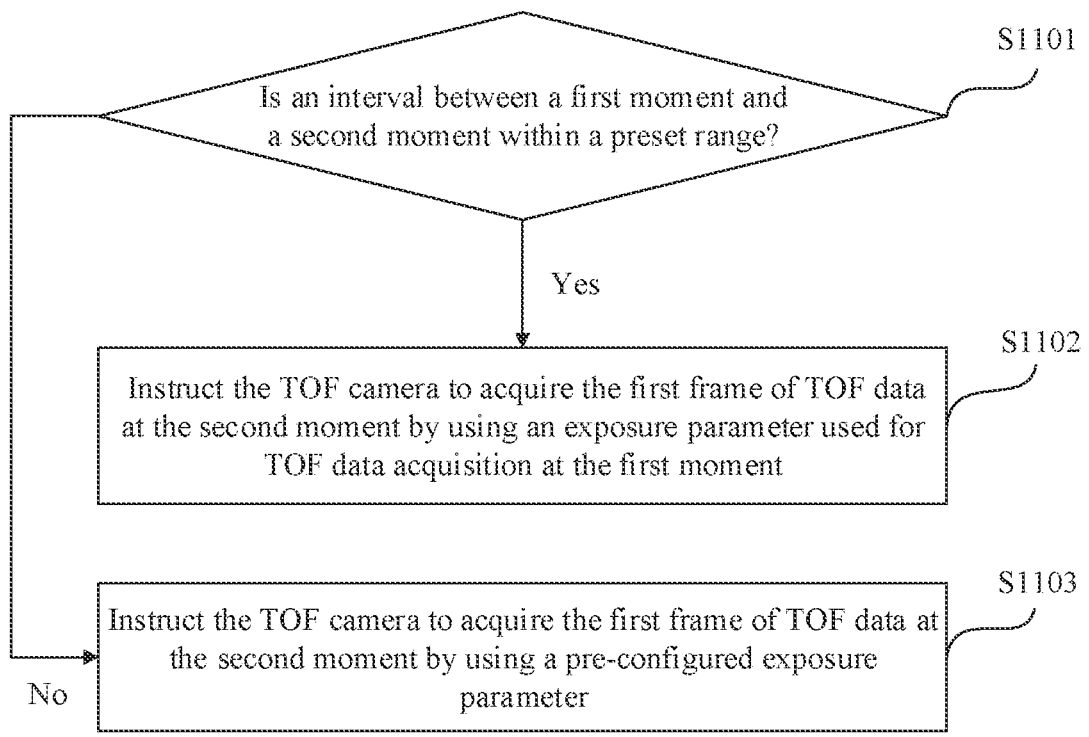
FIG. 11 is a flowchart of another data obtaining method disclosed in an embodiment of this application.

FIG. 11 shows another data obtaining method disclosed in an embodiment of this application, which is performed by the Camera HAL3 shown in FIG. 3 and includes the following steps.

S1101. Determine whether an interval is within a preset range in response to an image request. and if yes, perform S1102, or if no, perform S1103.

The interval is an interval between a moment when TOF data is acquired for the last time (referred to as a first moment for short) and a moment when the first frame of TOF data is to be acquired (referred to as a second moment for short).

It can be understood that, because the Camera HAL3 drives the TOF camera to acquire TOF data via the TOF camera driver at the kernel layer, the Camera HAL3 may select the second moment based on a moment when an image output command is sent to the TOF camera driver. For example, a moment with a given latency added to the moment when the image output command is sent to the TOF camera driver is used as the second moment. For another example, to simplify the process, the Camera HAL3 may directly take a current moment of a system as the second moment.

In this embodiment, the first frame of TOF data refers to, as shown in FIG. 4A and FIG. 4B, FIG. 5A and FIG. 5B, or FIG. 6A and FIG. 6B, the first frame of TOF data acquired by the TOF camera as triggered by a task request sent by the application. The last time may refer to the last frame of TOF data acquired by the TOF camera as triggered by the last task request sent by the application.

S1102. Instruct the TOF camera to acquire the first frame of TOF data at the second moment by using an exposure parameter used for the last TOF data acquisition.

As mentioned above, because parameters of the TOF camera can be adjusted by using an AE result, the exposure parameter used for the last TOF data acquisition is highly likely to be an adjusted exposure parameter. Also, because the interval between the first moment and the second moment is within the preset range, the acquisition at the second moment may be performed in the same environment as the last acquisition, and therefore the exposure parameter used for the last TOF data acquisition is highly likely to be also applicable to the current environment, which helps obtaining TOF data of higher quality, thereby helping obtaining a TOF image of higher quality.

S1103. Instruct the TOF camera to acquire the first frame of TOF data by using a pre-configured exposure parameter.

If the interval between the first moment and the second moment is relatively long, it means that a relatively long period of time has passed since the last TOF data acquisition, and therefore it is likely that the environment in which the electronic device is located has changed. Therefore, the exposure parameter used for the last TOF data acquisition is not applicable to a current environment, so it does not make much sense to reuse the exposure parameter used for the last TOF data acquisition. The pre-configured exposure parameter is therefore used.

The data obtaining method described in this embodiment makes full use of an exposure parameter adjusted using an AE adjustment mechanism so as to improve quality of the first frame of TOF data and thereby obtain a TOF image of higher quality, which helps improve the accuracy and speed of facial recognition.

It can be understood that, in the foregoing steps, the exposure parameter used for the last TOF data acquisition is only one implementation. The moment when TOF data is acquired for the last time is the latest moment to the second moment, and therefore the comparison with the last TOF data acquisition is for the purpose of saving computation resources.

However, this embodiment is not limited to the comparison with the last TOF data acquisition, and any acquisition before the second moment can be compared with that at the second moment. Therefore, the condition that the first moment meets can be summarized as: being earlier than the second moment with an interval to the second moment within the preset range.

Figure 12:
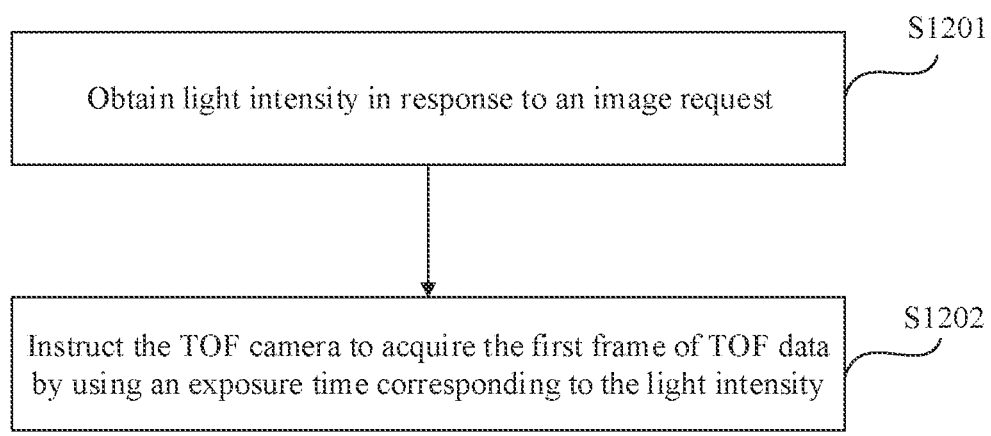
FIG. 12 is a flowchart of still another data obtaining method disclosed in an embodiment of this application.

FIG. 12 shows another data obtaining method disclosed in an embodiment of this application, which is performed by the Camera HAL3 shown in FIG. 3 and includes the following steps.

S1201. Obtain light intensity in response to an image request.

In this step, the ambient light sensor of the electronic device may be used to obtain light intensity of an environment in which the electronic device is located.

S1202. Instruct the TOF camera to acquire the first frame of TOF data by using an exposure time corresponding to the light intensity.

In this embodiment, a correspondence between a plurality of light intensity ranges and exposure times is pre-configured, where the correspondence meets the following principles.

1. The light intensity range includes an indoor light intensity range and an outdoor light intensity range.

As a pre-configured fixed exposure time may not be applicable to an outdoor environment, different exposure times are used for indoor and outdoor environments, and therefore light intensity ranges are needed in order to reflect such difference.

Further, due to a wide range of light intensity variations in outdoor environments, it is necessary to further distinguish exposure parameters used for different light intensity ranges in outdoor environments.

2. A larger value in the light intensity ranges corresponds to a shorter exposure time.

Because a longer exposure time leads to a greater brightness of an image, in an outdoor environment, only a shorter exposure time can make it possible to avoid decrease of sharpness of an image caused by a greater brightness.

An example of the correspondence configured based on the foregoing principles is as follows:

L≤500 lux and t=1 ms (fixed value by default);
500 lux<L≤3000 lux and t=0.7 ms;
3000 lux<L≤30000 lux and t=0.5 ms; and
L>30000 lux and t=0.3 ms.

In the foregoing example, L represents light intensity, t represents exposure time, and L≤500 lux is an indoor light intensity range, that is, if L is less than 500 lux, the electronic device is deemed to be in an indoor environment. In this case, the default fixed exposure time is used.

500 lux<L≤3000 lux, 3000 lux<L≤30000 lux, and L>30000 lux are ranges further defined for outdoor environments. It can be seen that among the three ranges, a range with larger values corresponds to a shorter exposure time.

It can be understood that the granularity of light intensity ranges of outdoor environments as in the foregoing example is adjustable. A smaller granularity means finer control over the exposure time, which is more conducive to improving image quality, thereby more conducive to improving the speed of image processing.

It can be understood that the Camera HAL3 may transmit the exposure time corresponding to the light intensity to the TOF sensor controller of the TOF camera via the TOF camera driver.

It can be seen that, in this embodiment, the exposure time for acquiring the first frame of TOF data is obtained based on the light intensity of the environment in which the electronic device is located, which helps acquiring TOF data whose brightness meets the requirement of facial recognition in the first frame, thereby helping improve the accuracy and speed of facial recognition.

Figure 13:
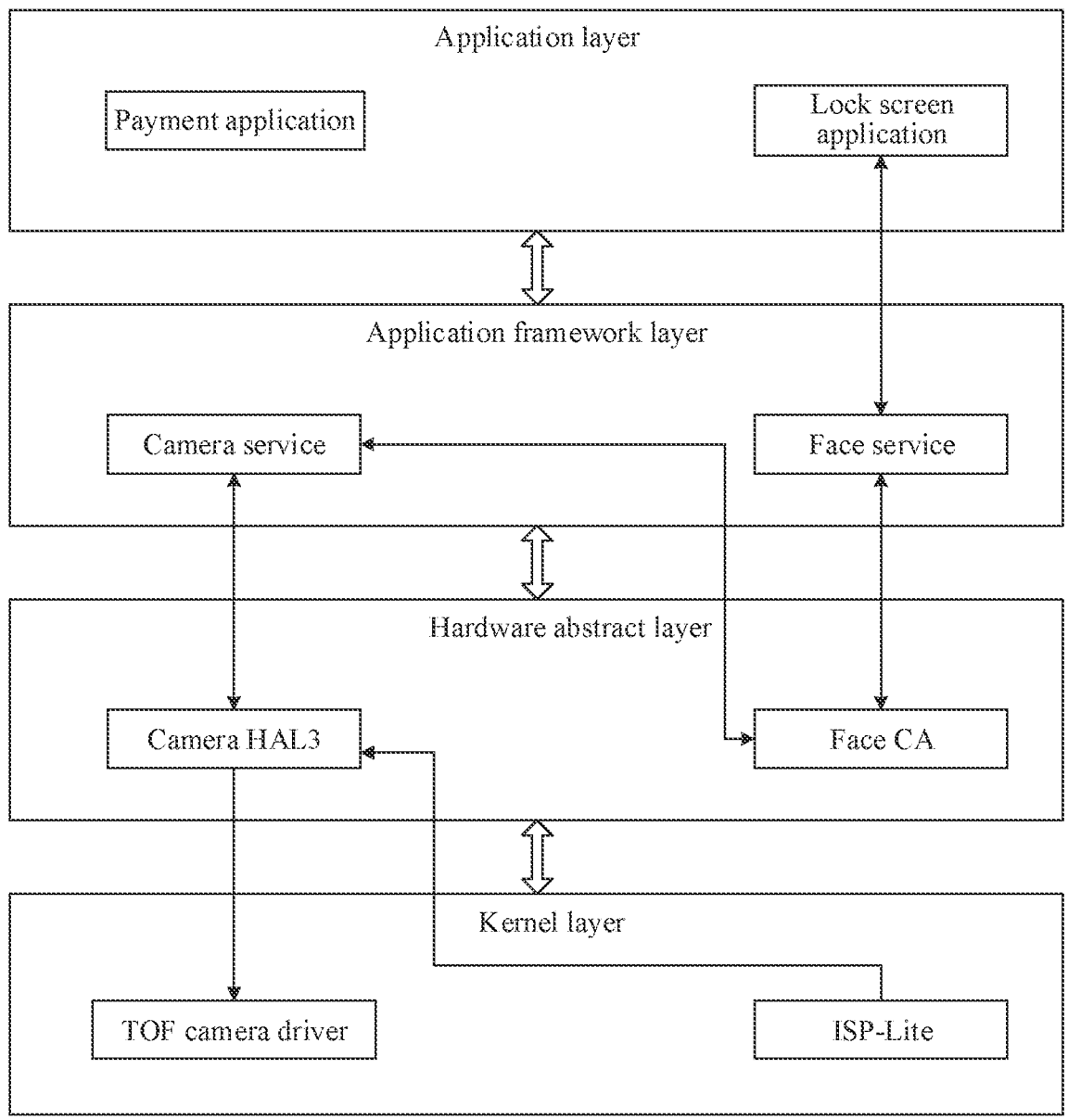
FIG. 13 is a schematic diagram of another software framework for implementing facial recognition by an electronic device.

It should be noted that the processes shown in FIG. 7 to FIG. 12 are not limited to the software framework shown in FIG. 3, but may also be applied to the software framework shown in FIG. 13.

In FIG. 13, the TEE is not present, which means processing of TOF data and facial recognition are both performed in the REE, specifically, in the Face CA. Therefore, TOF data rather than storage information of TOF data can be directly transmitted between modules. FIG. 13 differs from FIG. 3 in that after the ISP-Lite receives TOF data acquired by the TOF camera, what is transmitted to the Face CA via the Camera HAL3 and the camera service is the TOF data. The Face CA processes the TOF data into a TOF image and uses the TOF image for facial recognition.

Based on FIG. 13, all the steps in the process shown in FIG. 7 are performed by the Face CA. After receiving the first frame of TOF data, the Face CA processes the first frame of TOF data into the first frame of TOF image and obtains the first AE result, transmits the first AE result to the Camera HAL3, and obtains the first recognition result by using the first frame of TOF image for facial recognition. If the first recognition result indicates that the recognition is successful, the Face CA transmits the first recognition result to the face service; or if the first recognition result indicates that the recognition is unsuccessful, the Face CA continues to receive the seventh frame of TOF data.

Based on FIG. 13, all the steps in the process shown in FIG. 8 are performed by the Face CA, which are not further described herein.

Based on FIG. 13, for the process shown in FIG. 10, the data processing module is replaced with the Face CA, for which further description is omitted.

The processes shown in FIG. 11 and FIG. 12 are applicable to FIG. 13.

It can be understood that the processes shown in FIG. 7 to FIG. 12 are not limited to the Android operating system either. In other operating systems, a module with the same functions as the data processing module can implement the foregoing steps performed by the data module, and a module with the same functions as the Camera HAL3 can implement the foregoing steps performed by the Camera HAL3.

An embodiment of this application further discloses a system on chip, including: at least one processor and an interface, where the interface is configured to receive code instructions and transmit the code instructions to the at least one processor; and the at least one processor runs the code instructions to implement at least one of the foregoing facial recognition method, data obtaining method, and data processing method.

For a specific process of the processor implementing the foregoing functions, refer to the preceding embodiments. Details are not repeated herein.

An embodiment of this application further discloses a readable storage medium, where the readable storage medium stores program code; and when the program code is executed by a computer device, at least one of the facial recognition method, data obtaining method, and data processing method described in the foregoing embodiments is implemented.

What is claimed is:

1. A data obtaining method, comprising:
    obtaining a first facial recognition frame, wherein the first facial recognition frame is a first frame in multiple facial recognition frames in time of flight (TOF) data, wherein the TOF data is data acquired by a TOF camera as triggered by a task request received from an application, wherein the first facial recognition frame acquired by the TOF camera is stored into a trusted execution environment (TEE) via a kernel layer, wherein the first facial recognition frame comprises projection off data and infrared data, and wherein the projection off data is TOF data acquired by the TOF camera with a TOF light source being off;
    determining, in the TEE, that a data block satisfying a preset condition is present in the infrared data, wherein the preset condition comprises that a number of data points in the data block with brightness values greater than a first threshold is greater than a second threshold; and
    obtaining, in the TEE, based on a difference between the infrared data and the projection off data, data used for generating a first frame of a TOF image, wherein the projection off data is subtracted from the infrared data to obtain the data used for generating the first frame of the TOF image.

2. The data obtaining method of claim 1, wherein the obtaining the first facial recognition frame comprises:
  acquiring the projection off data after the TOF camera turns off the TOF light source; and
  acquiring the infrared data after the TOF camera turns on the TOF light source.

3. The data obtaining method of claim 2, wherein before the acquiring the projection off data, the method further comprises:
  acquiring depth data used for generating a depth image while the TOF light source of the TOF camera is on.

4. The data obtaining method of claim 3, wherein an occasion for controlling the TOF camera to turn off the TOF light source is determined based on a first exposure time for acquiring the depth data.

5. The data obtaining method of claim 3, wherein an occasion for controlling the TOF camera to turn on the TOF light source is determined based on an exposure time for acquiring the projection off data.

6. The data obtaining method of claim 4, wherein an exposure time for acquiring the projection off data is the first exposure time for acquiring the depth data or a second exposure time for acquiring the infrared data.

7. The data obtaining method of claim 2,
  wherein the TOF camera turning off the TOF light source comprises controlling the TOF light source to be turned off via a TOF sensor of the TOF camera; and
  wherein the TOF camera turning on the TOF light source comprises controlling the TOF light source to be turned on via the TOF sensor of the TOF camera.

8. The data obtaining method of claim 1, further comprising:
  obtaining a second facial recognition frame, wherein the second facial recognition frame is a second frame in the multiple facial recognition frames in the TOF data, wherein the second facial recognition frame comprises second projection off data and second infrared data, and wherein the second projection off data is TOF data acquired by the TOF camera with the TOF light source being off;
  determining that no data block satisfying the preset condition is present in the second infrared data; and
  processing the second frame into a second frame of the TOF image.

9. The data obtaining method of claim 1, further comprising:
  generating the first frame of the TOF image; and
  performing facial recognition by using the first frame of the TOF image so as to obtain a recognition result.

10. The data obtaining method of claim 1, wherein before the obtaining the first facial recognition frame, the method further comprises:
  determining, of a safety indication frame, that human eyes are safe when the TOF light source is on, wherein the safety indication frame is TOF data acquired before the first facial recognition frame is acquired.

11. The data obtaining method of claim 1, further comprising:
  determining, of a safety indication frame, that human eyes are not safe when the TOF light source is on, wherein the safety indication frame is TOF data acquired before the first facial recognition frame is acquired; and
  controlling the TOF camera to shut down.

12. The data obtaining method of claim 1, wherein the TOF camera is a front-facing TOF camera.

13. An electronic device, comprising:
  a time of flight (TOF) camera;
  one or more processors; and
  one or more storage devices storing instructions that are operable, when executed by the one or more processors, to cause the one or more processors to perform operations comprising:
    obtaining a first facial recognition frame, wherein the first facial recognition frame is a first frame in multiple facial recognition frames in time of flight (TOF) data, wherein the TOF data is data acquired by a TOF camera as triggered by a task request received from an application, wherein the first facial recognition frame acquired by the TOF camera is stored into a trusted execution environment (TEE) via a kernel layer, wherein the first facial recognition frame comprises projection off data and infrared data, and wherein the projection off data is TOF data acquired by the TOF camera with a TOF light source being off;
    determining, in the TEE, that a data block satisfying a preset condition is present in the infrared data, wherein the preset condition comprises that a number of data points in the data block with brightness values greater than a first threshold is greater than a second threshold; and
    obtaining, in the TEE, based on a difference between the infrared data and the projection off data, TOF data used for generating a first frame of a TOF image, wherein the projection off data is subtracted from the infrared data to obtain the data used for generating the first frame of the TOF image.

14. The electronic device of claim 13, wherein the obtaining the first facial recognition frame comprises:
  acquiring the projection off data after the TOF camera turns off the TOF light source; and
  acquiring the infrared data after the TOF camera turns on the TOF light source.

15. The electronic device of claim 14, wherein before the acquiring the projection off data, the operations further comprise:
  acquiring depth data used for generating a depth image while the TOF light source of the TOF camera is on.

16. The electronic device of claim 15, wherein an occasion for controlling the TOF camera to turn off the TOF light source is determined based on a first exposure time for acquiring the depth data.

17. The electronic device of claim 15, wherein an occasion for controlling the TOF camera to turn on the TOF light source is determined based on an exposure time for acquiring the projection off data.

18. The electronic device of claim 16, wherein an exposure time for acquiring the projection off data is the first exposure time for acquiring the depth data or a second exposure time for acquiring the infrared data.

19. A system on chip, comprising:
  at least one processor; and
  an interface configured to receive code instructions and transmit the code instructions to the at least one processor,
  wherein the at least one processor runs the code instructions to implement operations comprising:
    obtaining a first facial recognition frame, wherein the first facial recognition frame is a first frame in multiple facial recognition frames in time of flight (TOF) data, wherein the TOF data is data acquired by a TOF camera as triggered by a task request received from an application, wherein the first facial recognition frame acquired by the TOF camera is stored into a trusted execution environment (TEE) via a kernel layer, wherein the first facial recognition frame comprises projection off data and infrared data, and wherein the projection off data is TOF data acquired by the TOF camera with a TOF light source being off;

determining, in the TEE, that a data block satisfying a preset condition is present in the infrared data, wherein the preset condition comprises that a number of data points in the data block with brightness values greater than a first threshold is greater than a second threshold; and obtaining, in the TEE, based on a difference between the infrared data and the projection off data, TOF data used for generating a first frame of a TOF image, wherein the projection off data is subtracted from the infrared data to obtain the data used for generating the first frame of the TOF image.

* * * * *

UNITED STATES PATENT AND TRADEMARK OFFICE
CERTIFICATE OF CORRECTION

| | |
|---|---|
| PATENT NO. | : 12,354,403 B2 |
| APPLICATION NO. | : 17/966142 |
| DATED | : July 8, 2025 |
| INVENTOR(S) | : Yuan et al. |

Page 1 of 1

It is certified that error appears in the above-identified patent and that said Letters Patent is hereby corrected as shown below:

On the Title Page

Item (71) Applicant: "Honor Device Co., Ltd., Guangdong (CN)" should read -- Honor Device Co., Ltd., Shenzhen (CN) --.

Signed and Sealed this
Fifth Day of August, 2025

Coke Morgan Stewart
*Acting Director of the United States Patent and Trademark Office*